US012368754B2

(12) United States Patent
Pullen, III et al.

(10) Patent No.: US 12,368,754 B2
(45) Date of Patent: Jul. 22, 2025

(54) SNAPSHOT PHISHING DETECTION AND THREAT ANALYSIS

(71) Applicant: Microsoft Technology Licensing, LLC, Redmond, WA (US)

(72) Inventors: Fredric W. Pullen, III, Carnation, CA (US); Michael David McCormack, Redmond, WA (US); Nerses Ghevondyan, Duvall, WA (US); Cristian C Berejan, Redmond, WA (US); Shreya Salikram Chowdhary, Lynnwood, WA (US); Mara Beth Fortini, Sammamish, WA (US); Devanshi M Gajjar, Redmond, WA (US); Millen May T Angeles, Issaquah, WA (US); Brian Keith Catlin, Kilauea, HI (US); Paresh Maisuria, Sammamish, WA (US); Charles J Strempler, Seattle, WA (US); Abhishek Sagar, Wake Forest, NC (US); Svetoslav G Paregov, Coconut Creek, FL (US); Christian Stockwell, Seattle, WA (US); Jason Joseph Weber, Medina, WA (US); Sinclaire Renee Hamilton, Sammamish, WA (US); Richard Joseph Murillo, Covington, WA (US)

(73) Assignee: MICROSOFT TECHNOLOGY LICENSING, LLC, Remond, WA (US)

( * ) Notice: Subject to any disclaimer, the term of this patent is extended or adjusted under 35 U.S.C. 154(b) by 286 days.

(21) Appl. No.: 18/186,646

(22) Filed: Mar. 20, 2023

(65) Prior Publication Data
US 2024/0323226 A1     Sep. 26, 2024

(51) Int. Cl.
H04L 9/40     (2022.01)

(52) U.S. Cl.
CPC ...... *H04L 63/1483* (2013.01); *H04L 63/1416* (2013.01); *H04L 63/1425* (2013.01)

(58) Field of Classification Search
CPC ............. H04L 63/1483; H04L 63/1416; H04L 63/1425

(Continued)

(56) References Cited

U.S. PATENT DOCUMENTS

| 2015/0143482 | A1* | 5/2015 | Barkan | .................. G06F 21/32 |
| | | | | 726/22 |
| 2016/0125193 | A1* | 5/2016 | Dai Zovi | ............ G06F 21/6209 |
| | | | | 726/28 |

(Continued)

FOREIGN PATENT DOCUMENTS

| CN | 115001832 A | * | 9/2022 | |
| CN | 115987686 A | * | 4/2023 | |
| EP | 2020798 A2 | * | 2/2009 | ......... H04L 63/1416 |

OTHER PUBLICATIONS

Chen et al., "GUI-Squatting Attack: Automated Generation of Android Phishing Apps," in IEEE Transactions on Dependable and Secure Computing, vol. 18, No. 6, pp. 2551-2568, Nov. 1-Dec. 2021, doi: 10.1109/TDSC.2019.2956035. (Year: 2021).*

(Continued)

*Primary Examiner* — Peter C Shaw
(74) *Attorney, Agent, or Firm* — Shook, Hardy & Bacon L.L.P.

(57) ABSTRACT

Embodiments of the technology described herein identify and mitigate phishing attempts by analyzing user input received at the operating system level. Initially, a credential, such as a username or password, is registered with the threat detection system. The technology described herein intercepts user input at the operating system level, generates a hash of the input, and compares it with a hash of a credential being monitored. The technology described herein will (Continued)

perform a threat assessment when a secret entry is detected. The threat assessment may use the application context and the network context as inputs to the assessment. When the threat assessment results in an unknown classification or when the snapshot is otherwise requested, a snapshot is captured to supplement the threat assessment. Based on user settings, the snapshot is consumed by a snapshot phishing machine learning model. Various mitigation actions may be taken when a threat is detected.

19 Claims, 26 Drawing Sheets

(58) Field of Classification Search
USPC .......................................................... 726/23
See application file for complete search history.

(56) References Cited

U.S. PATENT DOCUMENTS

| | | | |
|---|---|---|---|
| 2020/0358819 A1 | 11/2020 | Bowditch et al. | |
| 2021/0182411 A1* | 6/2021 | Soryal | G06F 21/53 |
| 2024/0045964 A1* | 2/2024 | Bednash | G06F 11/1451 |

OTHER PUBLICATIONS

Cai et al., "Implementation of Network Source Authentication and Path Validation Using Orthogonal Sequences," 2020 29th International Conference on Computer Communications and Networks (ICCCN), Honolulu, HI, USA, 2020, pp. 1-7, doi: 10.1109/ICCCN49398.2020.9209702. (Year: 2020).*

Mukta et al., "BIockchain-Based Verifiable Credential Sharing with Selective Disclosure," 2020 IEEE 19th International Conference on Trust, Security and Privacy in Computing and Communications (TrustCom), Guangzhou, China, 2020, pp. 959-966, doi: 10.1109/TrustCom50675.2020.00128. (Year: 2020).*

International Search Report and Written Opinion received for PCT Application No. PCT/US2024/019308, Jun. 4, 2024, 17 pages.

"Allow log on through Remote Desktop Services", Retrieved From: https://learn.microsoft.com/en-us/previous-versions/windows/it-pro/windows-server-2012-R2-and-2012/dn221985(v=ws.11), Aug. 31, 2016, 4 Pages.

"Bitmap Encoder Class", Retrieved From: https://learn.microsoft.com/en-us/uwp/api/Windows.Graphics.Imaging.BitmapEncoder?view=winrt-22621, Retrieved on: Oct. 14, 2022, 6 Pages.

"How do I ensure consistent image quality on RDP?", Retrieved From: https://stackoverflow.com/questions/52196704/how-do-i-ensure-consistent-image-quality-on-rdp, Sep. 6, 2018, 1 Page.

Ah-Sha, Elijah, "RDP Log-In Popup vs Log-In Screen", Retrieved From: https://community.spiceworks.com/topic/2190140-rdp-log-in-popup-vs-log-in-screen, Feb. 1, 2019, 6 Pages.

"RDP-Screenshotter", Retrieved From: https://github.com/zer0-t/RDP-screenshotter, Aug. 28, 2016, 2 Pages.

"Taking Screenshot on Remote Desktop to Show the Right-Click Sub-Menu", Retrieved From: https://social.technet.microsoft.com/Forums/en-US/ff054acb-908c-4f1e-942b-8b3c0d87d8d1/taking-screenshot-on-remote-desktop-to-show-the-rightclick-submenu, Retrieved on: Oct. 14, 2022, 5 Pages.

"Taking screenshots in the Microsoft Remote Desktop app from Mac OS X", Retrieved From: https://social.technet.microsoft.com/Forums/windowsserver/en-US/de9e77f5-db23-4844-919b-772b8eb88e9e/taking-screenshots-in-the-microsoft-remote-desktop-app-from-mac-os-x, Retrieved on: Oct. 14, 2022, 3 Pages.

"Troubleshoot an unreachable instance", Retrieved From: https://docs.aws.amazon.com/AWSEC2/latest/WindowsGuide/screenshot-service.html, Retrieved on: Oct. 14, 2022, 12 Pages.

Marchese, et al., "Screen capture protection in Azure Virtual Desktop", Retrieved From: https://learn.microsoft.com/en-us/azure/virtual-desktop/screen-capture-protection, Feb. 8, 2023, 4 Pages.

Reisner, Tomer, "Network device discovery and vulnerability assessments", Retrieved From: https://techcommunity.microsoft.com/t5/microsoft-defender-vulnerability/network-device-discovery-and-vulnerability-assessments/ba-p/2267548, Apr. 13, 2021, 18 Pages.

Reynolds, Luke, "How to determine OS of the remote host", Retrieved From: https://linuxconfig.org/how-to-determine-os-of-the-remote-host, Jan. 28, 2022, 11 Pages.

Robins, et al., "Configure device discovery", Retrieved From: https://learn.microsoft.com/en-us/microsoft-365/security/defender-endpoint/configure-device-discovery?view=o365-worldwide, Feb. 7, 2023, 4 Pages.

Robins, et al., "Device discovery frequently asked questions", Retrieved From: https://learn.microsoft.com/en-us/microsoft-365/security/defender-endpoint/device-discovery-faq?view=o365-worldwide, Feb. 22, 2023, 7 Pages.

Robins, et al., "Device discovery overview", Retrieved From: https://learn.microsoft.com/en-us/microsoft-365/security/defender-endpoint/device-discovery?view=o365-worldwide, Feb. 7, 2023, 7 Pages.

White, et al., "Windows Imaging Component Overview", Retrieved From: https://learn.microsoft.com/en-us/windows/win32/wic/-wic-about-windows-imaging-codec, Sep. 28, 2021, 2 Pages.

* cited by examiner

Phishing protection

When you sign into Windows using a password, help protect your password from malicious apps and sites.

◉ On

☑ Warn me about malicious apps and sites

☑ Warn me about password reuse

☑ Warn me about unsafe password storage

☑ Automatically collect website or app content when additional analysis is needed to help identify security threats Learn more

*FIG. 8.*

SNAPSHOT PHISHING DETECTION AND THREAT ANALYSIS

BACKGROUND

Schemes to fraudulently acquire another person's credential and password information have become more common on the Internet. One such scheme is referred to as "phishing." Phishing schemes can be quite elaborate and continue to grow in their level of sophistication. In some schemes, a user is diverted from a legitimate user interface, such as a webpage, to an illegitimate user interface, such as a fraudulent webpage, that is plausibly similar in appearance to the legitimate user interface. The user may be led to this type of fraudulent webpage by clicking a link, by incorrectly typing a web address, or by any other mechanism. Other schemes can be based on a user being convinced to visit a fraudulent website based on incorrect information, such as an e-mail purporting to be from a known business or service provider. In still other schemes, a user may correctly enter information to visit a desired website, but the user is re-routed due to a corrupted server. When a user is presented with a login and password prompt, the computer often has little or no context or guidance with which to evaluate whether the request for a login credential is legitimate. This makes advanced phishing schemes difficult or even impossible for a computer or server to detect and thereafter deter a user from engaging with malicious content.

SUMMARY

This Summary is provided to introduce a selection of concepts in a simplified form, which are further described below in the Detailed Description. This Summary is not intended to identify key features or essential features of the claimed subject matter, nor is it intended to be used as an aid in determining the scope of the claimed subject matter.

Embodiments of the technology described herein enhance and improve the identification and mitigation of phishing attacks by utilizing data derived from snapshots of a user's computing device. In particular, phishing attempts can be identified and mitigated by analyzing user input received at an operating system level and captured via a snapshot. Analyzing the input at the operating system level, which may be analyzed as it is received, allows for the detection of threats that may not be detected by an analysis of input at an application level. Embodiments of the technology described herein perform a threat assessment when a credential entry is detected.

Initially, a credential, such as a username or password, is registered with the threat detection system. Embodiments of the technology described herein are not limited for use with a username or password. A credential may be any type of secret or confidential information, such as Social Security numbers, credit card information, driver's license numbers, or passport IDs, that could be monitored by the system described herein. Embodiments of the technology described herein detect, at the operating system level, a credential entry as a user engagement with a login process, which may include instances where the user is entering credentials into an application or service, such as a webpage. The threat assessment is conducted to capture a snapshot of the user engagement with the login process and determine a security threat based on a present network content feature that is communicated to a distributed server system. As used herein in one example, the "snapshot" refers to a screenshot consisting of a portion of the user interface exposed to the user that is less than the entire screen. The snapshot may include a portion of a screenshot of the entire graphical user interface presented to the user. As further described herein, in some embodiments, a snapshot comprises image information corresponding to a state of a user interface, such as a graphical user interface (GUI), which may be presenting graphical information to a user. In particular, certain embodiments described herein are discussed in the context of a snapshot that is an image comprising a screenshot of graphical information presented on a screen for the user. Some embodiments of the snapshot are described as comprising a portion of the screenshot (i.e., less than the entire screen); however, it should be understood that the captured snapshot can include a screenshot of the entire screen, a snapshot of certain windows or background content, or any suitable area which can be defined and customized based on user preferences. Additionally, the embodiments herein are not limited to capturing visual content as part of the snapshot. In particular, in some embodiments, a snapshot represents a state of the user's computer system at the time the snapshot is formed. This state information can include various data regarding the operation of the computer system at or in proximity to the time the snap shot operation is carried out. For example, in one embodiment, "capturing a snapshot" includes capturing visual content that is dynamic (such as a video) or static (such as an image), as well as other types of content (such as sound, for example, made by a user or a hardware speaker of the computer).

The distributed server system may request more information to make a more complete threat assessment, and thereafter, the distributed server system requests the snapshot. Based on at least one of: (1) a snapshot feature extracted from the snapshot; (2) the present network content feature; or (3) a classification provided by a snapshot phishing classification logic implemented by a snapshot phishing machine learning model, the distributed server system determines a security mitigation. Additionally, a user may permit the captured snapshot, the present network content feature, the determined security threat, or the security mitigation to be shared with the distributed server system to train a machine learning model associated with the snapshot phishing classification logic, such as the snapshot phishing machine learning model.

In one embodiment, the machine learning model is trained on labeled user data, such as captured snapshots that were labeled based on whether or not the image was associated with a phishing threat. For example, a captured snapshot determined to correspond to a phishing threat is positively labeled (or negatively labeled), such that the positive label (or negative label) and the corresponding snapshot are used to train the snapshot phishing machine learning model. As another example, a captured snapshot determined to not correspond to a phishing threat (and therefore is benign) is negatively labeled (or positively labeled), such that the negative label (or positive label) and the corresponding snapshot are used to train the snapshot phishing machine learning model. In this manner, a snapshot phishing machine learning model can be improved through crowd-sourced data to improve the accuracy of identifying a security threat based at least on snapshots.

Among other possible classifications, the threat assessment may classify the credential input as a valid webpage, safe/unsafe application, invalid certificate, password reuse, untrusted, known malicious, and unknown. By employing the embodiments disclosed herein, the snapshot provides additional details relevant to the classification of the threat, thereby reducing previous threat assessments resulting in an unknown classification. Accordingly, more security mitigations may be taken because a threat is more likely to be identified and properly classified. A user and/or system administrator may specify, via their user profile, the security mitigation taken when a threat is detected or whether they consent to a snapshot being captured and communicated. Different security mitigations may be specified for different threat classifications.

BRIEF DESCRIPTION OF THE DRAWINGS

The technology described herein is illustrated by way of example and not limitation in the accompanying figures in which like reference numerals indicate similar elements and in which:

FIG. 8 is a diagram showing an example screenshot of a user interface including selectable controls for modifying embodiments of the technology described herein;

DETAILED DESCRIPTION

Figure 1:
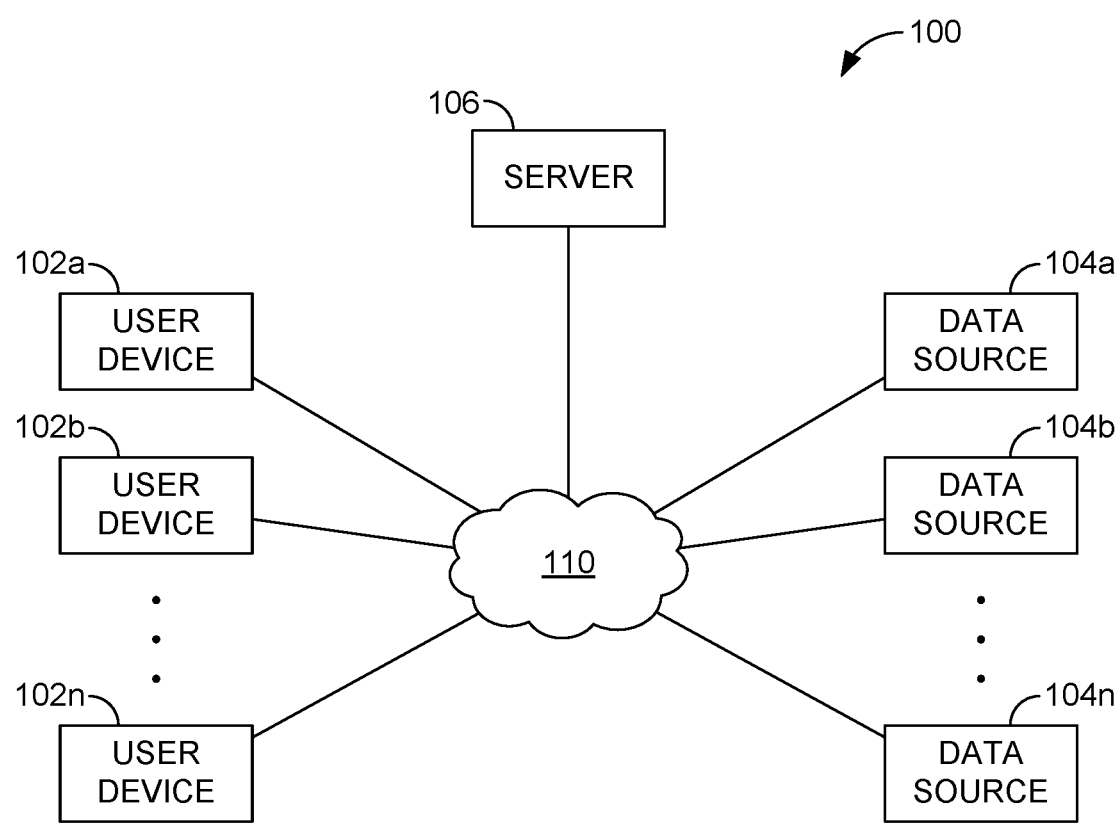
FIG. 1 is a block diagram of an example operating environment suitable for implementations of the present disclosure.

The various technologies described herein are set forth with sufficient specificity to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the technology described herein enhance and improve the identification and mitigation of phishing attacks by capturing a snapshot and using content from the snapshot to determine aspects of the users' experience that contributed to the user engaging with a phishing attack. According to some embodiments, a snapshot comprises image information corresponding to a state of a user interface, such as a graphical user interface (GUI), which may be presenting graphical information to a user. In particular, certain embodiments described herein are discussed in the context of a snapshot that is an image comprising a screenshot of graphical information presented on a screen for the user. Some embodiments of the snapshot are described as comprising a portion of the screenshot (i.e., less than the entire screen); however, it should be understood that the captured snapshot can include a screenshot of the entire screen, a snapshot of certain windows or background content, or any suitable area which can be defined and customized based on user preferences. Additionally, the embodiments herein are not limited to capturing visual content as part of the snapshot. In particular, in some embodiments, a snapshot represents a state of the user's computer system at the time the snapshot is formed. This state information can include various data regarding the operation of the computer system at or in proximity to the time the snap shot operation is carried out. For example, in one embodiment, "capturing a snapshot" includes capturing visual content that is dynamic (such as a video) or static (such as an image), as well as other types of content (such as sound, for example, made by a user or a hardware speaker of the computer).

Embodiments of the technology described herein identify and mitigate phishing attempts by analyzing user engagement with a login process received at the operating system level. Analysis of the user engagement is improved, for example, by capturing a snapshot of the user engagement, which provides additional context and visual information (in one example, referenced as "snapshot features") that enhance the operating system level analysis. Analyzing, at the operating system (OS) level, the input as it is received allows for the detection of threats that may not be detected by an analysis of input at the application level. A phishing application soliciting credentials is one example of an attack that could avoid detection at the application level, but can be detected by analyzing input received at the operating system level according to the technology described herein. In one embodiment, a snapshot is captured in response to a user inputting credentials. Additionally, certain snapshots of the phishing application soliciting credentials provides visual information that is not accessible at the application layer and can be consumed by a distributed server system to improve the identification and mitigation of phishing attempts.

In some embodiments, a credential, such as a username or password, is registered with the threat detection system, such as certain systems illustrated in FIGS. 1, 2A, 2B, 2C, 3A, 3B, 4A, 4B, 9, 10, 11, 12, 13, 14, and 15. Embodiments of the technology described herein are not limited for use with a username or password. A credential may be any type of secret or confidential information, such as Social Security numbers, credit card information, driver's license numbers, or passport IDs, that could be monitored by the system described herein. In one embodiment, a username and password for the operating system is automatically registered. A user interface may be provided for a user or other individual (for example, system administrator) to register additional credentials for monitoring. Additional user interfaces may be provided to control the capturing and distribution of the snapshots.

In some embodiments, the registered credentials are associated with the user in a credential data store, which is described as a credential manager herein, and is associated with a local operating system. In one embodiment, a hash of the credential is stored rather than the credential. In one embodiment, a hash of the credential is generated using a first function and stored for comparison with a hash generated from a user input. Embodiments of the technology described herein will perform a threat assessment when a credential entry is detected, without the credential or credential hash leaving the local operating system.

The technology described herein intercepts user input at the operating system level, generates a hash of the input, and compares it with a hash of a credential being monitored. In one embodiment, a hash of the last n characters received is generated where n is the character length of the credential. For example, a hash of the last eight characters entered may be generated and compared to a hash of an eight-character password. In another embodiment, hashes of less than the full credential are generated and used to detect potential entry of a credential before the entry is complete. For example, a hash of four characters, five characters, six characters, and seven characters could be generated in order to anticipate the entry of an eight-character password. In this example, the input strings are hashed at the character lengths that match hashes of partial credentials stored in the credential manager.

In one embodiment, a credential entry is detected when a hash for the character string entered matches a hash for a credential being monitored. In one embodiment, a potential credential entry is detected when a hash of the character string entered matches a hash for a partial credential. In one embodiment, a snapshot is captured in response to a credential entry being detected when the hash of the character string entered matches a hash for the potential credential. In one embodiment, a credential entry is detected in response to a copy and paste operation being performed in association with a credential entry text field. For example, a credential entry is detected based on copied text being pasted into the credential entry text field.

Embodiments of the technology described herein perform a threat assessment when a credential entry is detected. The threat assessment may use the application context and the network context as inputs to the assessment. Other information may also be used in the threat assessment process. Various sensors are used to identify characteristics of the application context and the network context. Embodiments of the technology described herein may use multiple context sensors: generic sensors, custom sensors, and enlightened sensors. Generic sensors provide basic network and process metadata for surfacing context about the identified threat. Custom sensors will be application specific sensors used for first-party applications, browsers, messaging, and other applications where credential entry occurs, as derived from telemetry. Although some embodiments are discussed in the context of a network context, it should be understood that some embodiments are more generally applicable based on any other context. In one embodiment, a mismatch corresponds to a mismatch between a present context and an expected context. For example, if the user is typing their password into Notepad.exe, this would be a mismatch between a present context and an expected context because the user would be expected to enter their password into a browser instead.

Applications with enlightened sensors may leverage an application programming interface (API) to directly provide context to the operating system. These applications may be specifically programed to interact with the technology described herein. In embodiments, code within the operating system shell layer may use the public API.

Among other possible classifications, the threat assessment may classify the credential input as a valid/invalid location, safe/unsafe application, invalid certificate, password reuse, untrusted, known malicious, and/or unknown.

As used herein and in one example, a "valid location" classification is assigned when a credential matches the appropriate identity providers and authentication servers used by an organization associated with the credential. For example, login.microsoft.com is associated with MICROSOFT®. When a credential associated with the user's MICROSOFT® account is entered when the network context shows that the credential is being communicated to login.microsoft.com, then the credential entry event may be classified as a valid location. If the network context shows a URL, or other characteristic, that is not associated with the credential's organization, then the location may be classified as invalid. An invalid classification may trigger a mitigation action, such as blocking communication of the credential to the URL or suspension of the credential.

As used herein and in one example, a "safe/unsafe application" is a prior classification assigned to the application receiving the password/credential entry. The classification indicates whether the application is safe or unsafe for receiving plain-text passwords. The application in question may be the active application to which the credential is addressed. Some applications are classified as unsafe for all passwords because they are known to be used in phishing attacks or is otherwise classified as unsecure or unsafe. For example, even if the application is secure, it is an unsafe practice to enter your password in the application, such as might occur if a user types a password into an email or document.

As used herein and in one example, an "invalid certificate classification" occurs when a location that is not known to be bad has an invalid certificate, which may indicate a potential man-in-the-middle attack. The certificate may be part of the network context.

As used herein and in one example, "password reuse" occurs when a password registered with a first organization is entered to log on to a trusted site of a different organization. For example, using a MICROSOFT® credential to log in to Facebook.com may be password reuse. In this example, the user chooses the same password for at least two different accounts, which is an unsafe practice. Some organizations have policies that prohibit employees from using the organization password for other accounts. In one embodiment, detection of password reuse results in a notification being communicated to the user and/or the organization. Suspension of the password is another possible mitigation in response to detecting password reuse. Password reuse, as used herein in one example, is different from password history enforcement, which may prevent a user from using the same password twice on a single system at different times. For example, a system that requires new passwords every month may prevent the user from reusing a password previously used on the system. Password reuse, as used herein, detects use of a single password on two different systems (for example, work account and social media account).

As used herein and in one example, an "untrusted classification" is assigned when a password is entered on an untrusted site (as indicated by a source that tracks known phishing sites and/or sites that pose a security risk).

As used herein and in one example, a "known malicious classification" is assigned when a password is entered on a known malicious site (as indicated by a source that tracks known phishing sites and/or sites that pose a security risk).

As used herein and in one example, an "unknown classification" may be assigned when a password entry does not fit into any of available classifications. The unknown classification may also be used when two or more of the classifications apply, for example, if there are two network connections and the assessment of one results in untrusted while the other results in password reuse. The unknown classification could also be assigned when the site appears to be a new phishing site that is yet to be tracked by any list of known phishing sites (or, conversely, safe/secure sites). In one example, the unknown classification is neither negative nor positive regarding whether a phishing attempt was determined. In this example, the unknown classification provides no definite conclusion regarding the threat assessment.

Embodiments of the technology described herein capture a snapshot when a credential entry is detected. In one embodiment, the snapshot is captured at the time the credential entry is detected. The snapshot may be temporarily cached for a predetermined period of time. For example, the captured snapshot is stored locally on the computing device until a distributed server system requests the captured snapshot. To avoid overloading a network bandwidth and to reduce latency, the distributed server system requests the captured snapshot in certain instances. For example, the distributed server system requests the snapshot when the threat assessment provides the "unknown classification." Thereafter, in one example, the snapshot is communicated to the distributed server system for further analysis.

Embodiments of the technology described herein access, via the distributed server system, a snapshot phishing machine learning model trained on a plurality of snapshot features from a plurality of snapshots. In one embodiment, the distributed system requests the snapshot based on the threat assessment having an unknown classification. Thereafter, in one embodiment, the distributed server system extracts snapshot features from the snapshot. Based on the extracted snapshot features, the distributed server system attempts to re-classify the threat and determine a security mitigation. In one example, reclassifying the threat includes comparing a snapshot feature of the snapshot to an existing and similar snapshot feature and assigning a similar classification as the snapshot from which the existing snapshot feature was taken. In one embodiment, the distributed server system communicates the classification of the threat and/or the security mitigation to the computing device.

Various security mitigations may be taken when a threat is detected, for example, based on the snapshot. A user and/or system administrator may specify the mitigation action taken when a threat is detected. Different mitigation actions may be specified for different threat classifications. One type of mitigation is threat reporting. Useful sensor data and telemetry, as well as snapshots, may be sent to a cloud protection service associated with the operating system vendor, or to a system administrator associated with an organization (for example, employer) managing the computing device. The same information may be made accessible to a user of the device being monitored. Phishing determinations may also be shared (considering all compliance and privacy guidelines) with a centralized threat-protection service that would benefit from leveraging the phishing data to better protect customers from phishing. The threat=protection service may employ the snapshot phishing machine learning model to improve detection and mitigation of phishing attacks.

In some embodiments, the security mitigations can also include user awareness efforts. From the user perspective, the phishing protection may have generic (not application specific) user interfaces that allow for blocking phishing attempts, changing passwords, warning about detected risks, phishing education, and social engineering training. These last two options may appeal to certain enterprises that would like to deliver targeted additional security training to end-users. Application-specific user interfaces can also be used. The communication of threat detection information could be enabled via a public API.

Overview of Technical Problems, Technical Solutions, and Technological Improvements Certain existing phishing prevention systems may attempt to identify a phishing attempt merely based on a uniform resource locator (URL) or other application system level data. However, this application system level data, by itself, fails to provide a computer or server with additional context or information to improve future identification of a phishing attempt and further fail to improve the future mitigation of phishing attempts. For example, certain existing phishing prevention systems block or restrict access to the URL associated with the phishing attempt. Restricting access to this URL may prevent future phishing attempts associated with the URL, but further fails to address the larger issue of determining which aspects of the user experience resulted in the user engaging with this phishing attack.

To address these and other issues, embodiments of the technology described herein enhance and improve the identification and mitigation of phishing attacks by utilizing data derived from snapshots of a user's computing device. By leverage data across different devices and users, a snapshot phishing machine learning model can be improved through crowd-sourced data to improve the accuracy of identifying a security threat based at least on snapshots. Additionally, by employing the embodiments disclosed herein, the snapshot provides additional details relevant to the classification of the threat, thereby reducing previous threat assessments resulting in an unknown classification. Moreover, to reduce latency, preserve computation resources, and avoid overloading a network bandwidth, embodiments of the technology described herein request the captured snapshot in certain instances. For example, the distributed server system requests the snapshot when the threat assessment provides the "unknown classification." Thereafter, in one example, the snapshot is communicated to the distributed server system for further analysis. In this manner, network bandwidth is conserved by not automatically communicating every snapshot. Locally, in some embodiments, a cache is employed to have the snapshot readily available to facilitate classifying the threat. The snapshot are deleted after a period of time or after a corresponding threat assessment has been completed. In this manner, the cache can be cleared or storage space updated to allow for storage of other data, thereby reducing memory strains that would otherwise be caused by storing and not deleting the snapshots.

Additional Description of the Embodiments

Having briefly described an overview of embodiments of the technology described herein, an exemplary operating environment in which embodiments of the technology described herein may be implemented is described below in order to provide a general context for various embodiments.

Turning now to FIG. 1, a block diagram is provided showing an example operating environment 100 in which some embodiments of the present disclosure are employed. It should be understood that this and other arrangements described herein are set forth only as examples. Other arrangements and elements (for example, machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. Each of the components shown in FIG. 1 may be implemented via any type of computing device, such as computing device 2000 described in connection to FIG. 20, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n may be client devices on the client-side of operating environment 100, while server 106 may be on the server-side of operating environment 100. In one embodiment, the server 106 implements aspects of the example computing environment 1900 of FIG. 19. In one embodiment, the server 106 implements aspects of the example distributed server system 336. In embodiments, the technology described herein may take the form of a security function running on a single user device. The security function may be part of the user device's operating system. The user devices may be protected by the threat=detection technology described herein. In particular, the threat detection may intercept user input at the operating system level, detect credential input, and conduct a threat assessment. The threat may by a phishing attempt originating on the server-side of the operating environment 100.

Server 106 may comprise server-side software designed to work in conjunction with client-side software on user devices 102a and 102b through 102n to implement any combination of the features and functionalities discussed in the present disclosure. For example, the server 106 may run a threat detection system that receives information about threats analyzed or detected. In one embodiment, the threat detection system implements aspects of the snapshot phishing machine learning model. System administrators for an organization may use the server 106 to set monitoring and mitigation parameters for the threat detection system running on user devices associated with the organization. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device 2000 described in relation to FIG. 20 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

Data sources 104a and 104b through 104n may comprise data sources and/or data systems, which are configured to make data available to any of the various constituents of operating environment 100. For example, the data sources may comprise email servers, social media servers, or other sources of objects that may be used to mount a phishing attack that is identified through the technology described herein. Data sources 104a and 104b through 104n may be discrete from user devices 102a and 102b through 102n, and server 106 or may be incorporated and/or integrated into at least one of those components.

Figure 2A:
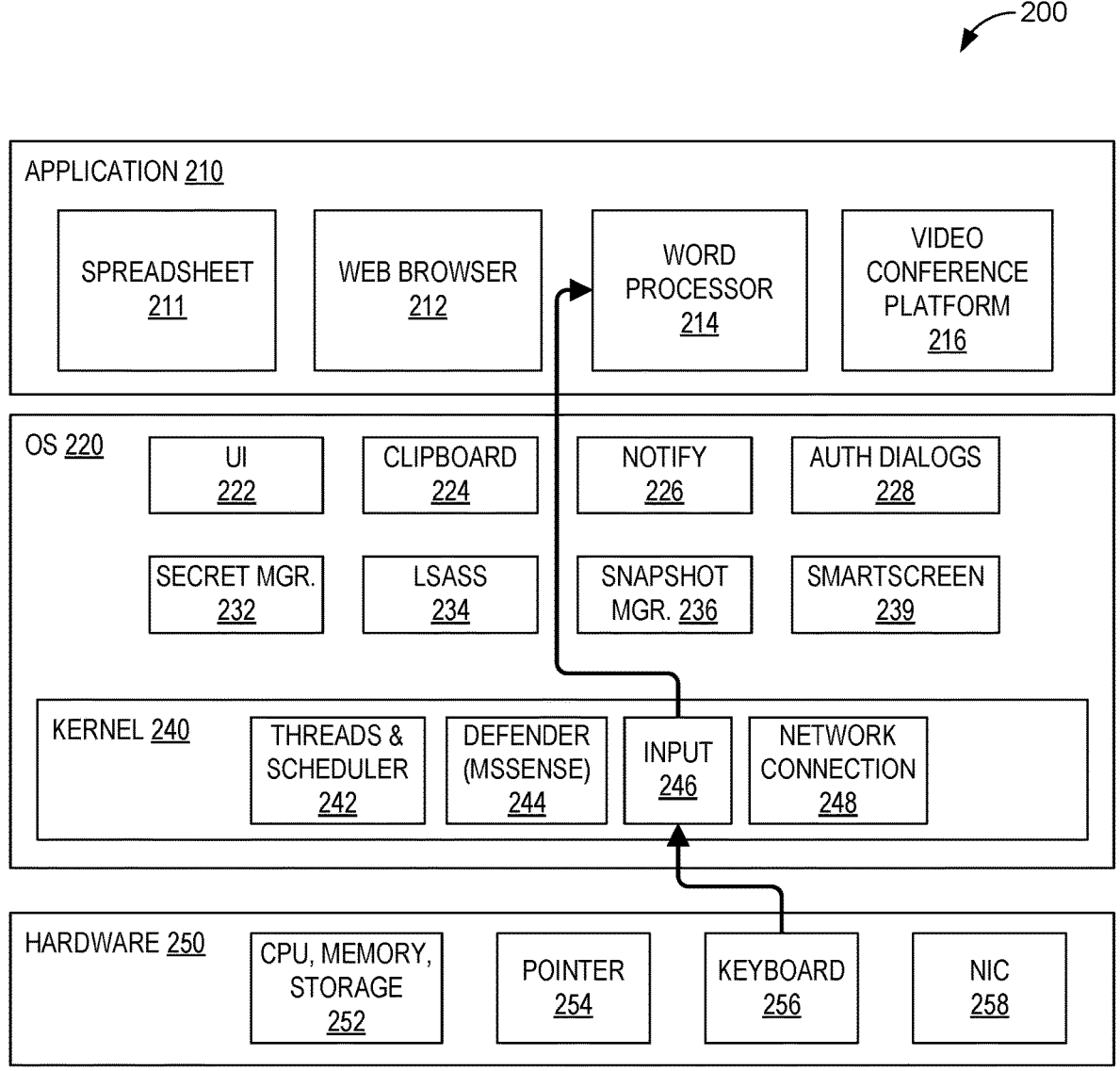
FIGS. 2A, 2B, and 2C are diagrams depicting the capture of keyboard and analysis of a keyboard entry at the operating system level, in accordance with an embodiment of the technology described herein.
Figure 2B:
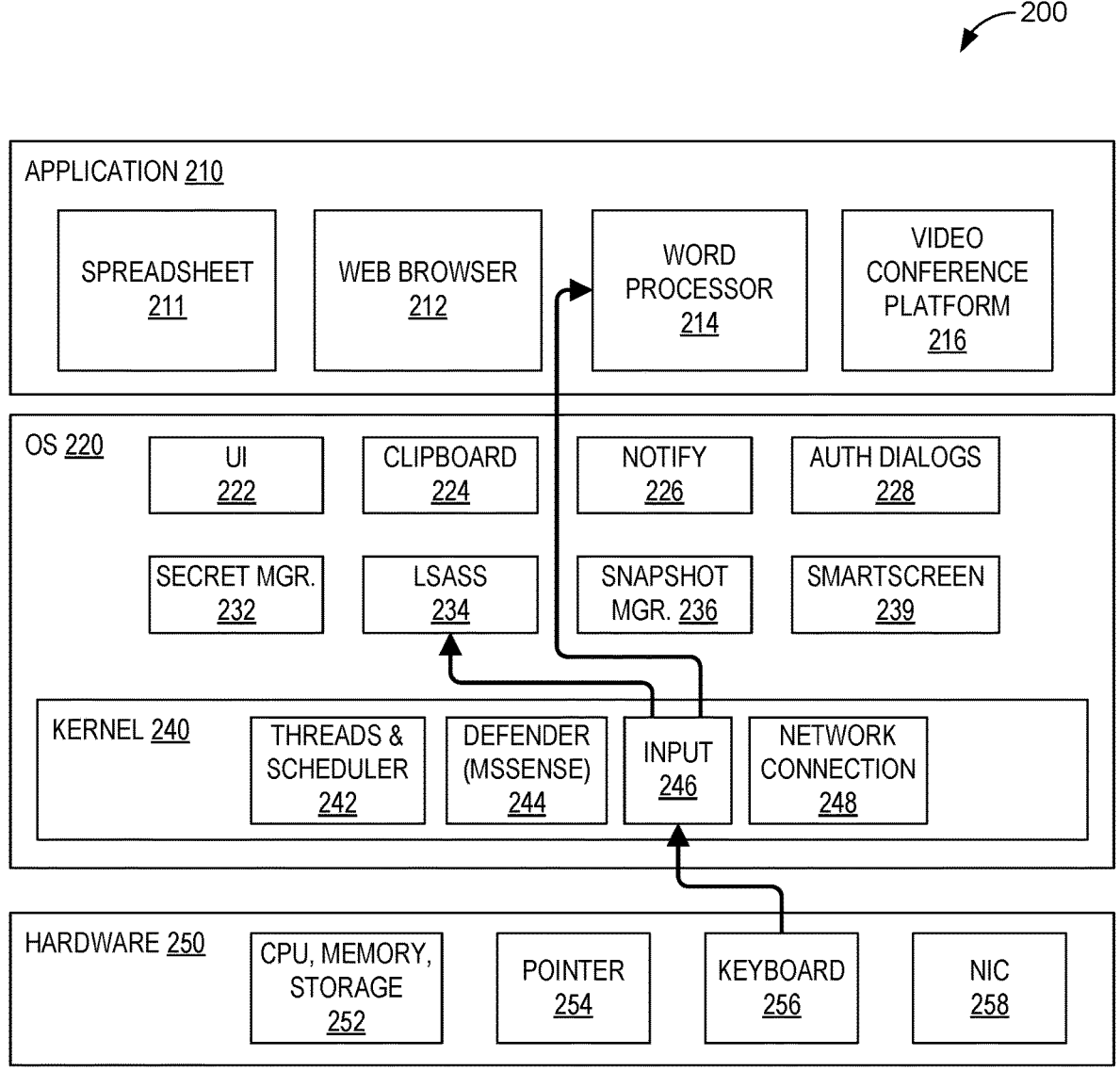
Figure 2C:
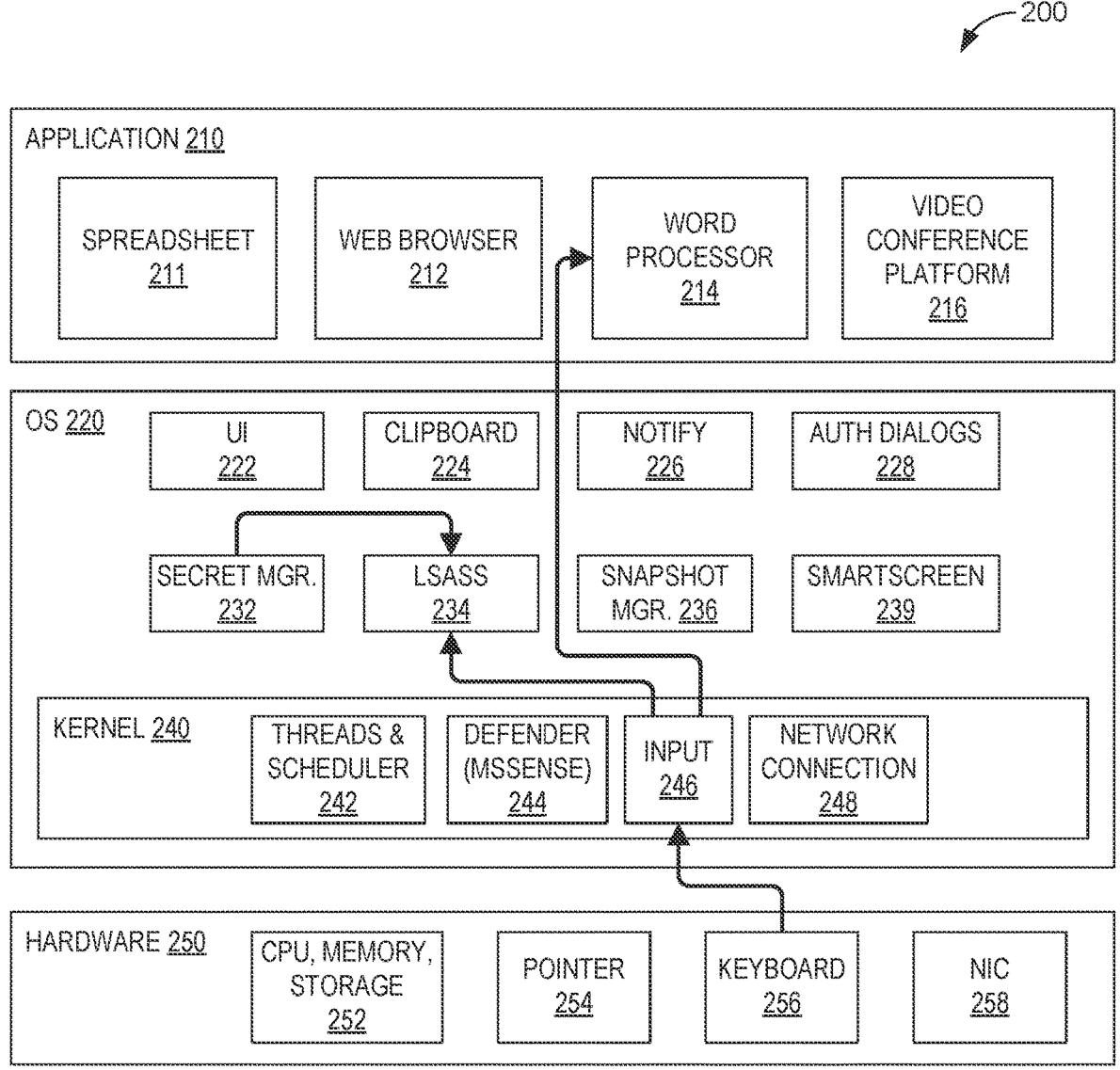

Operating environment 100 may be utilized to implement one or more of the components of computing environment 200, described in FIGS. 2A, 2B, and 2C, including components for password entry detection, context collection, threat assessment, mitigation, snapshot capture and management, and user awareness.

Turning now to FIG. 2A, a computing environment 200 suitable for use with embodiments of the technology described herein is provided. FIGS. 2-4 are used herein to illustrate how keystrokes are entered and how they may be analyzed by the technology described herein. A brief description of the components is shown before the actions taken to analyze keystrokes are described. Some components described in FIGS. 2A, 2B, and 2C are described using terms often used to describe components of the WINDOWS® operating system provided by MICROSOFT®. However, embodiments of the technology described herein are not limited to use with WINDOWS®. Embodiments of the features of the technology described herein may be added to other operating systems, as such as LINUX®, Android®, macOS®, iOS®, and the like, which can include many of the same components and perform similar functions.

The computing environment 200 comprises a hardware layer 250, operating system components 220, kernel components 240, and example applications. Together, with or without components not shown, the operating system components 220 may be described as an operating system. Some operating systems may combine a user mode and kernel mode or move operations around. In WINDOWS®, the processor switches between the two modes depending on what type of code is running on the processor. Applications run in user mode, and core operating system components run in kernel mode. While many drivers run in kernel mode, some drivers may run in user mode.

In some embodiments, when a user-mode application starts, the operating system creates a process for the application. In one embodiment, the process provides the application with a private virtual address space and a private handle table. Because an application's virtual address space is private, one application generally cannot alter data that belongs to another application. In addition to being private, in some embodiments, the virtual address space of a user-mode application is limited. For example, a processor running in user mode cannot access virtual addresses that are reserved for the operating system. In one embodiment, limiting the virtual address space of a user-mode application prevents the application from viewing, altering, and possibly damaging critical operating system data.

In some embodiments, all kernel components 240 share the same system address space (which is accessible only from kernel-mode). For example, a kernel-mode driver is not isolated from other drivers or the operating system itself.

As illustrated, embodiments of the operating system components 220 comprise kernel components 240. Many components of the operating system, such as a hardware abstraction layer between the hardware and the kernel components 240, are not shown in FIG. 2A, which includes illustrative components and components used in threat detection and/or assessment. In one embodiment, the "kernel," of which the kernel components 240 are a part, is a computer program at the core of a computer's operating system and has control over the system. Embodiments of the kernel facilitates interactions between hardware and software components. For example, the kernel controls hardware resources (for example, input/output (I/O), memory) via device drivers, arbitrates conflicts between processes concerning such resources, and optimizes the utilization of common resources (for example, central processing unit (CPU), memory, and storage 252). In some embodiments, the kernel is one of the first programs loaded on startup (after the bootloader). Once loaded, the kernel may handle the rest of startup, as well as memory, peripherals, and input/output (I/O) requests from software, translating them into data-processing instructions for the CPU.

The code of the kernel may be loaded into a separate area of memory, which is protected from access by application software or other, less critical parts of the operating system. In one embodiment, the kernel performs tasks, such as running processes, managing hardware devices such as the hard disk, and handling interruptions in this protected kernel space. In contrast, application programs like spreadsheets 211, browsers 212, word processors 214, or video conference platforms 216 may use a separate area of memory, sometimes described as a user mode. This separation generally helps prevent user data and kernel data from interfering with each other and causing instability and slowness, as well as preventing malfunctioning applications from affecting other applications or crashing the entire operating system.

The illustrated kernel components 240 include a thread manager and scheduler 242, a threat defender 244, an input manager 246, and a network connection manager 248. In some embodiments, the operating system kernel may include additional components. In one example, the thread manager and scheduler 240 handles the execution of threads in a process. In one example, an instance of a program runs in a process. In some embodiments, each process has an ID, a number that identifies it. In one example, a thread is a schedulable entity within a process, a stream of execution within a process.

In some embodiments, the threat defender 244 provides access control and reporting functionality. One function in the context of the technology described herein is to provide a reporting pipeline to enterprises on the security well-being of an enterprise device, such as an employee's laptop. As such, verdicts for each credential entry may be passed through the threat defender 244 to the enterprise such that IT admins can be alerted to a potential phishing attack or unsafe credential entry. This reporting can be part of various mitigation actions, such as disabling a password. In some embodiments, the operating system components 220 makes sure that the action is not a violation of system policy. For example, suppose a device is or is not accessible to all requests. Continuing this example, a driver allows some requests to succeed or fail, depending on the permission of the entity making the request. The threat defender 244 may use an access control list (ACL) to determine which objects have what security. The threat defender 244 may perform access checking before a handle can be opened to an object (such as a file, event, mutex, process, thread, and the like), and what operations may be performed on that object (create, read, write, delete, and the like).

In one example, the input manager 246 facilitates hardware input. Generally, a computer consists of various devices, such as the I/O components 2020 of FIG. 20, which provide input and output (I/O) to and from the outside world. Typical devices are keyboards, mice, audio controllers, video controllers, disk drives, networking ports, and so on. In one embodiment, device drivers provide the software connection between the devices and the operating system. In some embodiments, the input manager 246 manages the communication between applications and the interfaces provided by device drivers.

In one example, the network connection manager 248 manages communications between the NIC 258, components of the operating system 220, and applications 210. In one example, the network connection manager 248 provides network context information. The network manager may interact with one or more drivers to implement networking in the operating system.

The operating system components 220 may reside outside of the kernel and comprise a secret manager 232, the Local Security Authority Subsystem Service (LSASS) 234, snapshot manager 236, and SmartScreen application 239. Operating system components are omitted from FIGS. 2A, 2B, and 2C for the sake of simplicity.

In one example, the secret manager 232 manages credentials. The secret manager 232 may use a credentials management API and credentials management user interface (UI) functions to obtain and manage credential information, such as usernames and passwords. These functions request that the account information (for example, MICROSOFT® account or GOOGLE® account) be used instead of the credentials established while logging on, such as a pin. Such requests typically occur when the logon credentials do not have permissions that are required by the application. In one embodiment, the credentials management UI functions provide interfaces with the appearance of the operating system user interface. For example, these functions include customizable options that add users' information to the users' credentials store. The secret manager 232 can receive credentials to be monitored for threat detection. In one embodiment, the credential management interface allows monitoring and mitigation preferences to be provided.

In one example, the LSASS 234 is responsible for enforcing the security policy on the system. For example, the LSASS 234 verifies users logging on to a computer or server, handles password changes, and creates access tokens. In one embodiment, the LSASS 234 provides stored credentials or secrets to other components described herein. For example, the LSASS provides a credential for entry detection. Once entry is detected, a decision may be made whether the environment or context for the credential entry is secure.

In one example, the snapshot manager 236 is responsible for capturing snapshots associated with a potential phishing attack. In one embodiment, the snapshot manager captures a snapshot when user inputs indicative of credential inputs is detected. In one example, the snapshot includes a smaller portion than the entire screenshot of the entire user interface presented to the user. In this manner, the snapshot may omit sensitive or confidential information displayed on a background that would otherwise be captured if the entire screenshot was used. For example, the snapshot manager 236 may format (for example, crop, cut, blur, or only capture a subset of the entire screen presented to a user to format) the snapshot. In one example, the snapshot manager may format the snapshot into any suitable image formats, including, but not limited to, Joint Photographic Experts Group (JPEG/JFIF), Exchangeable image file format (Exif), Tagged Image File Format (TIFF), Graphics Interchange Format (GIF), BMP file format (Windows bitmap), Portable Network Graphics (PNG), Portable Pixmap (PPM), WebP, BAT, and the like. In some embodiments, the entity requesting the snapshot image (for example, the distributed server system of FIG. 3) specifies a desired image format, and the snapshot manager 236 converts the snapshot to the desired image format.

After the snapshot manager 236 captures the screenshot, the snapshot is locally stored, for example, in the storage 252. As a result, the snapshot can be captured and locally cached for a period of time so that the snapshot can be communicated to a distributed server system (such as server 106 of FIG. 1 and/or distributed server system 336 of FIG. 1) upon request by the distributed server system 336. In this manner, network bandwidth is conserved by not automatically communicating every snapshot to the distributed server system 336. Instead, in some embodiments, the snapshot is communicated upon a request from the distributed server system 336 for the snapshot. For example, the distributed server system 336 requests the snapshot based on a mismatch between a present network context and an expected network context for an application being inconclusive, based on an unknown classification assigned to the mismatch, or based on a prior snapshot not having been previously communicated within a threshold time value.

In one example, SmartScreen 239 determines whether a web site is potentially malicious by analyzing visited webpages looking for indications of suspicious behavior and by checking the visited sites against a dynamic list of reported and machine identified phishing sites and malicious software sites. The SmartScreen 239 may be in communication with a cloud component that attempts to identify phishing sites and malicious software sites. For example, if SmartScreen finds a match, SmartScreen 239 shows a warning to let the user know that the site might be malicious.

In some embodiments, SmartScreen 239 determines whether a downloaded app or app installer is potentially malicious by checking downloaded files against a list of reported malicious software sites and programs known to be unsafe. SmartScreen 239 may be in communication with a cloud component that attempts to identify whether a downloaded app or app installer is potentially malicious. In one example, if a malicious verdict is given, SmartScreen 239 shows a warning to let the user know that the site or application might be malicious. Embodiments of SmartScreen 239 check downloaded files against a list of files that are well known and downloaded by many Windows users. If the file is not on that list, SmartScreen 239 shows a warning, advising caution.

In one example, the shell is the portion of the operating system that allows the user to communicate with the operating system, including the kernel. The operating system components 220 also comprise components that may be considered part of the OS shell, such as user interface component 222, clipboard 224, notification component 226, and authorization dialogs 228.

In one example, the user interface component 222 provides the operating system's main user interface, such as the desktop in WINDOWS®. In one example, the clipboard 224 is an interface feature that may capture objects (such as files, text, or images) in the operating system user interface and/or application interfaces and performs an operation on the captured object (such as a copy, cut, or move). For example, the clipboard 224 allows a user to copy text from a first application interface to a different interface or different location in the first application interface.

In one example, the notification component 226 manages notifications provided through the operating system. In some embodiments, the notifications originate with an application or service, such as an email application or social media service. Certain notifications allow the user to provide information and could be a potential phishing source, for example, through a compromised application. In one embodiment, the authorization dialog 228 allows the user to provide and/or confirm information that is used to authenticate the user to various entities and components.

Among other components, the illustrated hardware layer comprises CPU, Memory, and storage 252; a pointer 254; a keyboard 256; and a network interface controller (NIC) 258. The CPU, memory, and storage may be similar to those described in FIG. 20. In some embodiments, the pointer 254 is a mouse, track ball, touch screen, touch pad, natural user input interface (for example, an interface that receives a body or voice gesture), or some other input device that controls a location of an interface pointer. In one example, the keyboard 256 is a physical keyboard or touchscreen keyboard.

In one example, the NIC 258 (also known as a network interface card, network adapter, LAN adapter or physical network interface, and by similar terms) is a computer hardware component that connects a computer to a computer network. In some embodiments, the NIC 258 allows computers to communicate over a computer network, either wirelessly or by using cables. The NIC 258 may be both a physical layer and data link layer device, as it generally provides physical access to a networking medium, and, for IEEE 802.11 protocol and similar networks, provides a low-level addressing system through the use of media access control (MAC) addresses that are uniquely assigned to network interfaces.

Example applications 210 include a spreadsheet 211, a web browser 212, a word processing application 214, and a video conference platform 216. These applications may be the source of phishing attacks detected by the technology described herein. In some embodiments, the snapshot manager 236 captures a snapshot. In one example, the "snapshot" refers to a portion of the user interface exposed to the user that is less than the entire screen. The snapshot may include a portion of a screenshot of the entire graphical user interface presented to the user. For example, the snapshot includes a screenshot of the application on which credentials are being entered. The snapshot manager 236 may omit, blur, or remove portions of the screen that may have sensitive information, such as personal identification information (PII) in violation of a privacy policy, such as any corporate, organizational, enterprise, state, or federal sensitivity policy. In this manner, the snapshot does not include privacy data that would otherwise violate a privacy policy by include a screenshot. Accordingly, embodiments of the snapshot manager 236 are configured with logic to detect and remove privacy information.

FIG. 2A illustrates how input signals from a keyboard 256 are communicated through the operating system to the application. In the example shown, a keystroke is entered on the keyboard 256, which causes a signal to be sent to the input manager 246. In this example, the input manager 246 receives a signal (for example, a scancode) from the keyboard driver (not shown) and may convert it to a new signal that identifies the character indicated by the keystroke, for example, as Unicode text. In the illustrated example, the character is then passed to the active application (the application into which the input is addressed), which in this case is the word processing application 214. In the illustrated example, the word processor application 214 then takes action based on the keystroke (for example, enters the keystroke in an active document). The flow shown in FIG. 2A is one example communications that occurs based on the technology described herein.

FIG. 2B shows that embodiments of the technology described herein use the input manager 246 to copy the keystroke to the LSASS 234. In the illustrated example, the keystroke is sent to the word processing application 214. The LSASS 234 may maintain a keystroke buffer that stores that last x number of keystrokes received.

Figure 5:
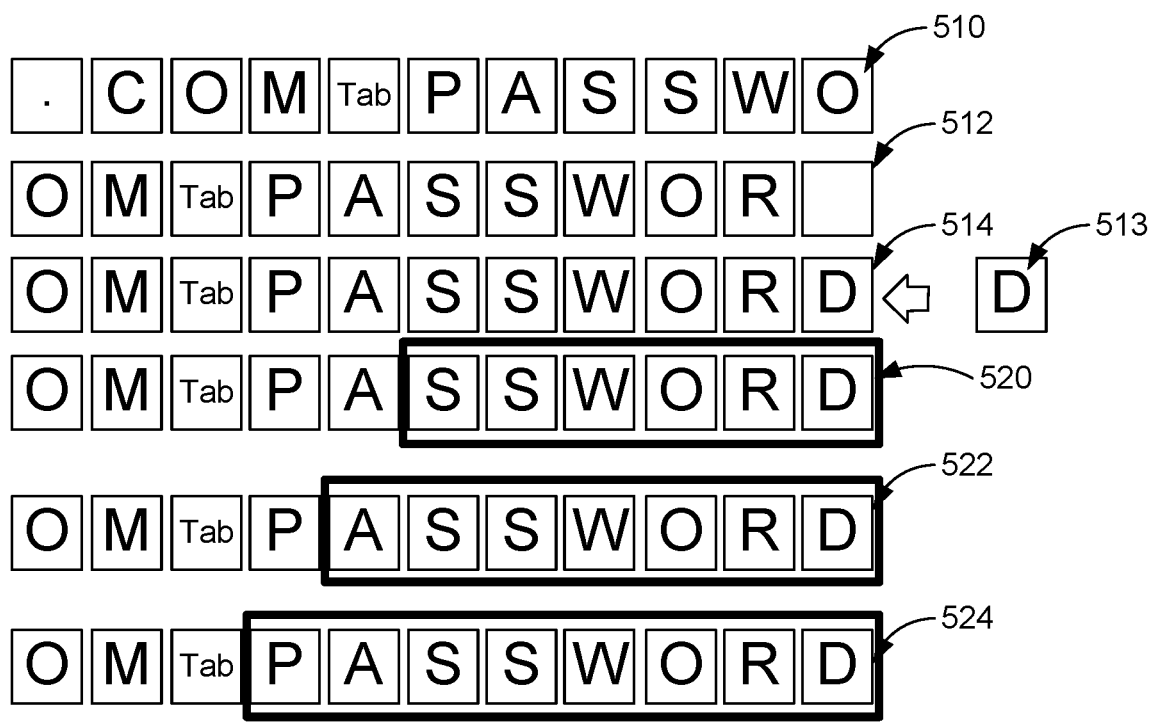
FIG. 5 is a diagram illustrating analysis of keystrokes in an input buffer to detect a credential, in accordance with an embodiment of the technology described herein.

An exemplary keystroke buffer is shown with reference to FIG. 5. As can be seen, the keystroke buffer stores the last 11 characters received. Embodiments of the technology can work with buffers of different sizes. In some embodiments, the buffer holds as many or more keystrokes as are in the longest credential being monitored. For example, with each new keystroke, the content of the buffer is updated to include the most recent stroke and remove the oldest. By way of non-limiting example, at a first point in time, the first content 510 starts with a period and ends with the letter "o." Continuing this example, at a second point in time, the second content 512 starts with an "o" and ends with a space. This content reflects the user entering the keystrokes "r" and a space, causing the period and "c" to be removed. Continuing this example, at a third point in time, the third content 514 reflects the entry of the backspace key to delete the space and the insertion of a "d." This illustrates a special case of keystroke buffer management involving the backspace key. In this example, when the backspace key is pressed the last letter entered is deleted but the backspace itself is not entered as a keystroke into the keystroke buffer. Other control keys, such as shift, cap lock, and the like, may be omitted from or included in the buffer.

As illustrated in FIG. 2C, a keystroke hash is generated from the keystroke buffer and compared to a hash of one or more credentials. Alternatively or additionally, a hash of a partial keyword may be compared to a hash for the keystroke buffer. In both instances, the hash can be generated from the same number of characters. For example, if the password contains eight characters, then a hash of eight characters from the keystroke buffer should be compared to a hash of the password. Both hashes may be generated using the same function. In another example, the partial hash of six characters from the password should be compared with a hash of six keystrokes from the buffer. These options are illustrated again with reference to FIG. 5, where a first hash 520 of the last six strokes is generated. In FIG. 5, a second hash 522 of the last seven strokes is also generated along with a third hash 524 of the last eight strokes. These three hashes could be compared against hashes of different credentials and/or partial credentials. In some embodiments, when a match is made between a hash from the keystroke buffer and a hash of a credential match, then a credential entry event is identified and threat assessment triggered. In some embodiments, a match is detected based on a user copying and pasting a string of characters into the text field. Various threat assessments are illustrated subsequently with reference to FIGS. 10-15.

Figure 3A:
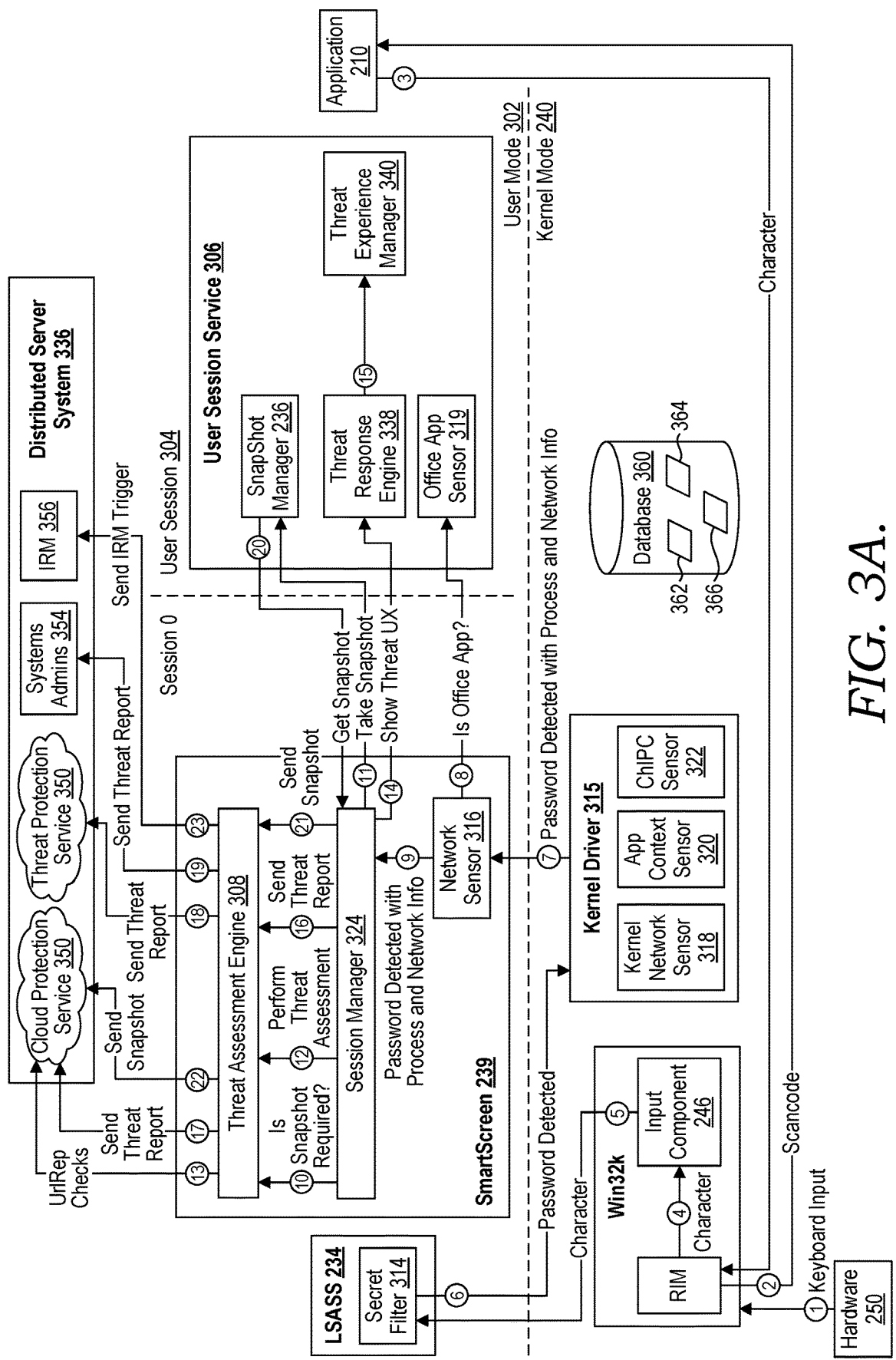
FIGS. 3A and 3B are block diagrams depicting an architecture used to detect a phishing website and capture a snapshot, in accordance with an embodiment of the technology described herein.
Figure 3B:
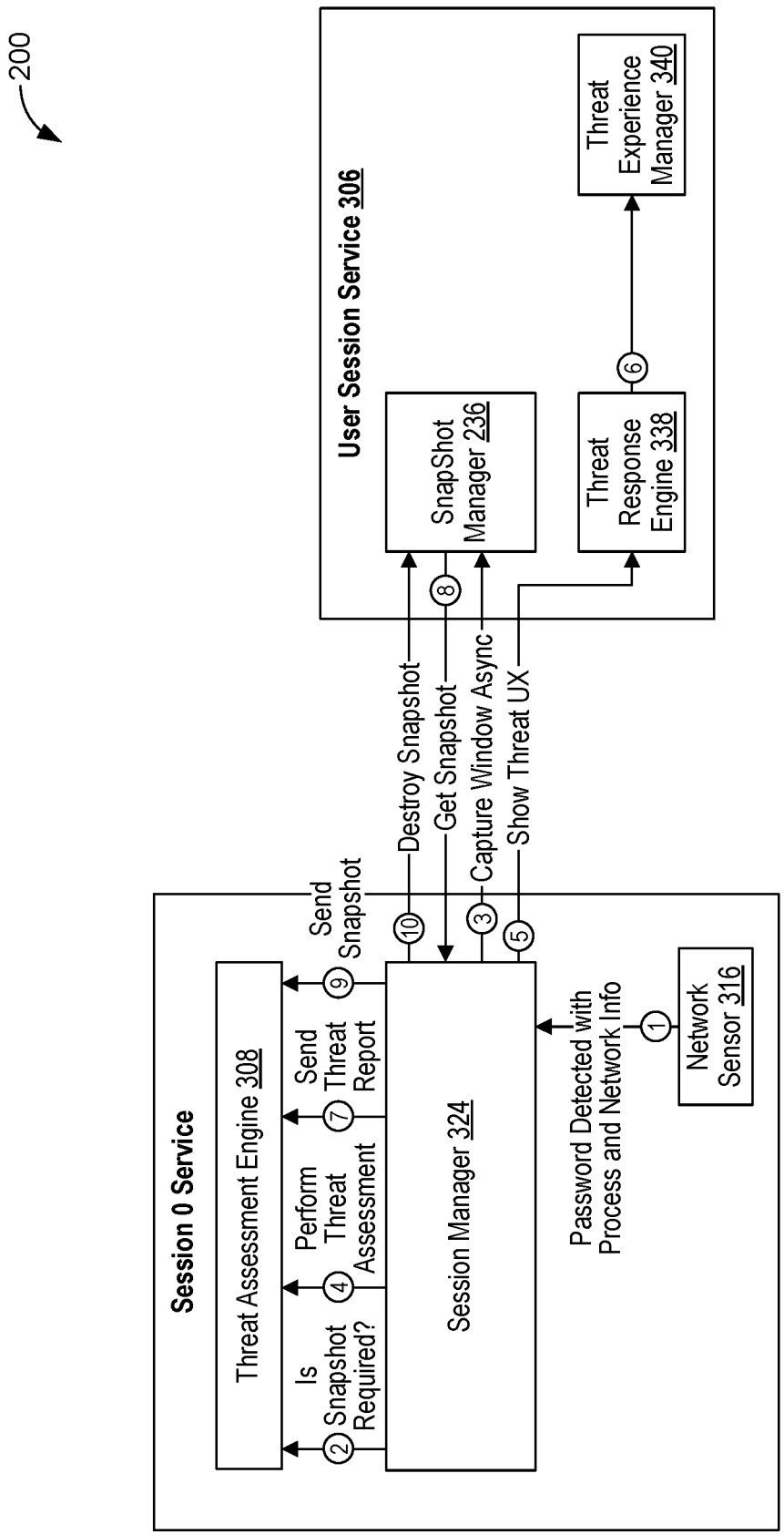

Turning to FIGS. 3A and 3B, illustrated are block diagrams depicting an example architecture 300 used to detect a phishing website and capture a snapshot, in accordance with an embodiment of the technology described herein. As illustrated, architecture 300 includes user mode 302, which includes both session 0 and a user session 304. In one embodiment, session 0 implements the SmartScreen 239. In one embodiment, the user session 304 implements the user session service 306. Whereas FIG. 3B includes the components of the session 0 and the user session 304, FIG. 3A includes more details regarding these components, as well as other components.

Threat assessment functions, such as those associated with the threat assessment engine 308, may cooperate with the LSASS 234 and SmartScreen 239. Initially, in this example, a keystroke is received via a component (such as a keyboard of) hardware layer 250. Continuing this example, the keystroke is communicated to a remote infrastructure management (RIM) 309. In some embodiments, the RIM communicates a signal, such as a scancode, to an application, which returns a character. In this example, the character is communicated via the input manager 246 to a secret filter 314, which is part of the LSASS 234. In some embodiments, the secret filter 314 compares a keystroke hash to a credential hash and determines whether a credential has been typed. When a credential is recognized, then a threat assessment is performed by the threat assessment engine 308. In one embodiment, performing the threat assessment includes querying the kernel driver 315 for application contest and network context, among other data.

In some embodiments, the threat assessment engine 308 uses the application context and network context, among other data, to identify a threat or lack thereof. A network sensor 316 may receive network status information from components of the kernel driver 315, such as a kernel network sensor 318 and possibly other alternative or additional operating system components. The network status information may include the URL, an internet protocol (IP) address, a process ID, a server name indication (SNI), domain information (for example, domain name), and other characteristics of the ongoing communication sessions between outside resources. In some embodiments, the network sensor 316 communicates network status or application context information to the office app sensor 319. For example, the WINDOWS® OS includes the office app sensor 319 to monitor WINDOWS® applications. In this manner, the office app sensor 319 can monitor information and derive more information from an applications associated with or commonly owned with the provider of the operating system.

In some embodiments, the application context sensor 320 retrieves state information for the application into which the credential is being entered. The application context sensor 320 can perform process mapping to determine which processes are involved with the threat. For example, the application context sensor 320 maps detected inputs (for example, keystrokes) to network connections. Input entry may occur in one process and flow through the web via the same process or an entirely different process (for example, a network broker process). In one embodiment, the application context sensors 320 provide insights into this flow to identify the set of relevant network connections. Once the relevant network connections are identified, the network context can be built using these connections. In some embodiments, the insights identified by the application context sensors 320 include, but are not limited to, a process tree, an application process model, inter-process communication, API surface, process launch command line arguments, process invocation source (e.g., launched by file manager, another app like Outlook, etc.), associated I/O handles, and function call stacks.

In another mapping example, the application context sensor 320 maps input to known safe patterns to uncover potentially unsafe cases. Legitimate credential entry for a given application typically occurs according to a well-known pattern where a deviation from said pattern may indicate an unsafe behavior. For example, credential entry in a word processing application 214 (FIG. 2) should occur in a credential-dialog-box process or a login page hosted within a WebView process. In this example, all other credential entry is potentially unsafe. For example, credential entry into the process that hosts the document body implies password caching. Similar safe/unsafe patterns exist for messaging apps (for example, the safe credential entry through a dialog hosted within a WebView process vs. a chat window process). The function call stack can also be used to determine safe/unsafe contexts. In one embodiment, an observed function call stack associated with how an application typically requests credentials (for example, function foo invokes function foobar) are classified as safe; any other call stack may be unsafe.

In one embodiment, the ChIPC sensor 322 determines operating parameters of the computing device running the OS. For example, the ChIPC sensor 322 includes an accelerometer, a microphone, a force sensor, a tachometer, and the like. In this manner, the ChIPC sensor 322 may capture additional user activity, such as sound, touch inputs, and the like, that could facilitate threat assessment.

The application context data store (contained in storage 252 or in a storage device of the distributed server system 336) stores information about threatening and non-threatening application contexts. For example, the application-context data store may store application contexts where entry of a password is expected. In one embodiment, if the password is being entered and the application context does not match a context where the password entry is expected, then a threat detection results, depending on other factors considered. In some embodiments, the session manager 324 gathers application and network context data and may pre-process it into a format suitable for the threat assessment engine 308. In one embodiment, the session manager 324 oversees the threat detection and passes the application context, network context, and credential detected to the threat assessment engine 308. The threat assessment engine 308 determines whether a threat is present. In one embodiment, the threat is detected by analyzing a series of rules that define threats. These rules may result in assignment of a classification to the detected credential entry.

Among other possible classifications, the threat assessment engine 308 may classify the credential input as a valid/invalid location, safe/unsafe application, invalid certificate, password reuse, untrusted, known malicious, and/or unknown.

As used herein and in one example, a "valid location" classification is assigned when a credential matches the appropriate identity providers and authentication servers used by an organization associated with the credential. For example, login.microsoft.com is associated with MICROSOFT®. When a credential associated with the user's MICROSOFT® account is entered when the network context shows the credential is being communicated to login.microsoft.com, then the credential entry event may be classified as a valid location. If the network context shows a URL, or other characteristic, that is not associated with the credential's organization, then the location may be classified as invalid. An invalid classification may trigger a mitigation action, such as blocking communication of the credential to the URL or suspension of the credential.

As used herein and in one example, a "safe/unsafe application" is a prior classification assigned to the application receiving the password/credential entry. The classification indicates whether the application is safe or unsafe for receiving plain-text passwords. The application in question may be the active application to which the credential is addressed. Some applications are classified as unsafe for all passwords because they are known to be used in phishing attacks or otherwise classified as unsecure or unsafe. For example, even if the application is secure, it is an unsafe practice to enter your password in the application, such as might occur if a user types a password into an email or document.

As used herein and in one example, an "invalid certificate classification" occurs when a location that is not known to be bad has an invalid certificate, which may indicate a potential man-in-the-middle attack. The certificate may be part of the network context.

As used herein and in one example, "password reuse" occurs when a password registered with a first organization is entered to log on to a trusted site of a different organization. For example, using a MICROSOFT® credential to log in to Facebook.com may be password reuse. In this example, the user chooses the same password for at least two different accounts, which is an unsafe practice. Some organizations have policies that prohibit employees from using the organization password for other accounts. In one embodiment, detection of password reuse results in a notification being communicated to the user and/or the organization. Suspension of the password is another possible mitigation in response to detecting password reuse. Password reuse, as used herein in one example, is different from password history enforcement, which may prevent a user from using the same password twice on a single system at different times. For example, a system that requires new passwords every month may prevent the user from reusing a password previously used on the system. Password reuse, as used herein, detects use of a single password on two different systems (for example, work account and social media account).

As used herein and in one example, an "untrusted classification" is assigned when a password is entered on an untrusted site (as indicated by a source that tracks known phishing sites and/or sites that pose a security risk).

As used herein and in one example, a "known malicious classification" is assigned when a password is entered on a known malicious site (as indicated by a source that tracks known phishing sites and/or sites that pose a security risk).

As used herein and in one example, an "unknown classification" may be assigned when a password entry does not fit into any of available classifications. The unknown classification may also be used when two or more of the classifications apply. An example of this would be if there are two network connections and the assessment of one results in untrusted while the other results in password reuse. The unknown classification could also be assigned when a site that appears to be a new phishing site that is yet to be tracked by any list of known phishing sites (or conversely safe/secure sites). In one example, the unknown classification is neither negative nor positive regarding whether a phishing attempt was determined. In this example, the unknown classification provides no conclusion of definite result regarding the threat assessment.

In some embodiments, after the session manager 324 receives an indication of the credential inputs, network contextual information, and/or application contextual information, the session manager 324 causes the snapshot manager 236 to capture a snapshot. In one embodiment, the snapshot manager 236 locally caches the snapshot (in storage 252 [FIG. 2]). To determine whether to retrieve the captured snapshot from the snapshot manager 236 or the local cache, embodiments of the session manager 324 query the threat assessment engine 308. In some embodiments, the threat assessment engine 308, in turn, queries the distributed server system 336.

In some embodiments, when a threat is detected, the existence of a threat is communicated to one or more components or entities. These may include mitigation components, such as the components of the distributed server system 336; UI components, such as the threat response engine 338 and the threat experience manager 340; the user; and the like. Embodiments of the distributed server system 336 include or provide access to a cloud protection service 350, a threat protection service 352, system administrators 354, an information rights management (IRM) system 356, and the like. The threat assessment engine 308 may communicate the existence of the threat to the distributed server system 336 as a threat report that includes the network context information, the application context information, or any additional information, such as that described herein.

In some embodiments, the threat assessment engine 308 performs UrlRep checks to determine whether a particular URL (as identified by the network sensor 316) is of a reputable source or likely to be a phishing link. In one embodiment, the threat assessment engine 308 communicates the UrlRep checks to the distributed server system 336. In one embodiment, the threat assessment engine 308 appends the UrlRep checks to the threat report that is communicated to the distributed server system 336.

In embodiments where the threat assessment performed by the threat assessment engine is inconclusive or classified as unknown, the threat report received by the distributed server system 336 indicates the "unknown" classification. In response to receiving the unknown classification, embodiments of the distributed server system 336 communicate a request for a snapshot captured by the snapshot manager 236. In this manner, the distributed server system 336 may perform certain image recognition operations to determine snapshot features. In some embodiments, the distributed server system 336 includes storage device 360, which provides access to various logic modules accessible by a snapshot phishing machine learning model. In one example, the snapshot phishing machine learning model attempts to reclassify the previous threat, which was classified as "unknown." The snapshot phishing machine learning model classifies the threat attempt using any of the logic components discussed herein.

In some embodiments, the distributed server system 336 implements snapshot feature detection logic 362 configured to identify snapshot features in a snapshot. Embodiments of the snapshot feature detection logic 362 employ a You Only Look Once (YOLO) methodology, Region-based Convolutional Neural Network (R-CNN) methodology, Single Shot Detector (SSD) methodology, or any suitable model that may detect multiple objects in different classes, locations, and scales. Embodiments of the snapshot feature detection logic 362 train the snapshot phishing machine learning model using labeled or unlabeled snapshots from various classified phishing scenarios, such as those having the classifications discussed herein. In this manner, the snapshot feature detection logic 362 may produce more accurate results based on snapshots having different colors, fonts, shades, textures, and other image parameters.

In some embodiments, the distributed server system 336 implements snapshot training logic 364, for example, to train the snapshot phishing machine learning model. In one embodiment, the snapshot training logic 364 includes computing logic to train the snapshot phishing machine learning model. The snapshot training logic 364 may determine snapshot feature data used to train the snapshot phishing machine learning model. In one embodiment, the snapshot training logic 364 may determine the snapshot feature data used to train the snapshot phishing machine learning model via any suitable process. For example, the snapshot training logic 364 may determine the snapshot feature data via any suitable engineering process, which may include at least one of the following steps: brainstorming or testing features, deciding which features to create, creating the features, testing the impact of the created features on an object or training data, and iteratively improving features. Embodiments of the snapshot training logic 364 determine the snapshot feature data using any suitable computations, including, but not limited to, (1) numerical transformation (for example, taking fractions or scaling), (2) employing a category encoder to categorize data, (3) clustering techniques, (4) group aggregation values, (5) principal component analysis, and the like. In some embodiments, the snapshot training logic 364 assigns different levels of significance to the snapshot feature data, such that certain snapshot feature data that has a higher level of significance are weighted accordingly when the snapshot training logic 364 trains a machine learning (ML) model. In this manner, the snapshot training logic 364 may prioritize and/or rank video data features to improve identifying, tracking, and/or classifying the object.

In some embodiments, the distributed server system 336 implements snapshot phishing classification logic 366, for example, as part of a snapshot phishing machine learning model. In one embodiment, the snapshot phishing classification logic 366 includes computing logic to detect, track, and classify the snapshot captured and/or formatted by the snapshot manager 236. In some embodiments, the snapshot phishing classification logic 366 determines various snapshot features contained in the snapshot. Example snapshot features include, but are not limited to, a text font size, a text style, a text color, a text language, a text arrangement, a color, a shape, a bounded box, or a graphical user interface (GUI) element.

In some embodiments, the snapshot phishing classification logic 366 may employ classification methodologies to determine a context and classification of snapshot features identified in the snapshot. In some embodiments, the snapshot phishing classification logic 366 employs the snapshot phishing machine learning model that is trained and generated by the distributed server system 336. The snapshot phishing classification logic 366 may define logic for using the snapshot phishing machine learning model to detect, track, and classify the snapshot features. For example, the snapshot phishing machine learning model may include a deep learning model, a neural network model, a logistic regression model, a support vector machine model, and the like. Example snapshot phishing machine learning models may employ a YOLO methodology, a faster region-based convolutional neural network (RCNN) methodology, SSD methodology, and the like.

The snapshot phishing classification logic 366 may employ any suitable classification or prediction algorithm to classify and/or predict the identity of a snapshot based on, for example, snapshot feature data, the network context information, the application context information, and/or any information contained in the threat report. Example snapshot features include, but are not limited to, a text font size, a text style, a text color, a text language, a text arrangement, a color, a shape, a bounded box, or a GUI element. It should be understood that the embodiments disclosed herein may be broadly applied to predict any suitable object, in addition to or other than those described herein.

Although this example is discussed in the context of the distributed server system 336 requesting the snapshot when the threat assessment results in an "unknown" classification, it should be understood that the distributed server system 336 can request the snapshot based on any additional or alternative classification, such as those discussed herein or others. Additionally, although this example is discussed in the context of the distributed server system 336 requesting the snapshot, any component discussed herein, such as the threat assessment engine 308, can request the snapshot from the snapshot manager 236. Additionally, in some embodiments, the snapshot manager 236 automatically sends the snapshot to the session manager 324, threat assessment engine 308, or any component of session 0. When the snapshot manager 236 communicates the snapshot, the snapshot manager 236 may automatically delete the snapshot, for example, from the cache in which the snapshot may be stored.

Figure 7:
FIG. 7 is a diagram showing an example screenshot of a user interface associated with the capture and send of a snapshot.

With respect to the threat assessment being communicated to UI components of the user session service 306, embodiments of the threat response engine 338 can control the threat assessment engine 308. For example, the threat response engine 338 queries the user for permission before the snapshot manager 236 captures or stores the snapshot. FIG. 7 depicts an example screenshot of a user interface 700 for receiving approval to capture and send a snapshot. The user may select the "share my image" control to cause the snapshot manager 236 to communicate the snapshot. In some embodiments, the threat response engine 338 controls whether to disable or enable the snapshot manager 236, or whether to send a particular snapshot captured by the snapshot manager 236 based on the user input.

In some embodiments, the threat response engine 338 controls downstream handling of the snapshot, for example, after the snapshot manager 236 communicates the snapshot to the threat assessment engine 308. To help illustrate, FIG. 8 depicts an example screenshot of a user interface 800, including selectable controls for modifying embodiments of the technology described herein. In this example, a user can make various checkbox selections to enable or disable whether to "warn others about suspicious apps and sites," "warn the user about malicious apps and sites," "warn the user about password reuse," or "warn the user about unsafe password storage." Other customizations or controls are possible.

In some embodiments, the snapshot is communicated only in certain instances. For example, the snapshot is communicated based on the threat assessment resulting in an "unknown classification," based on a mismatch between the present network context and an expected network context (as determined by the threat assessment engine 308) for the application being inconclusive, based on a snapshot not having previously been taken for this user within a threshold period of time. With respect to the latter case, the threshold period of time may be a preset time period or a dynamically variable period of time. In the context of a preset time period, embodiments of the snapshot manager 236 and the threat response engine 338 restrict sending the snapshot until the preset time period has expired. Example preset time periods include any number of minutes, hours, days, weeks, months, or any suitable time period. In this manner, bandwidth is preserved and computational resources are conserved since the snapshot is only captured or communicated at an infrequent rate. In some embodiments, the distributed server system 336 may bypass the period of time to request a snapshot when the threat assessment engine 308 classifies the threat assessment as any particular classification. In this manner, the distributed server system 336 may request a snapshot when it determines that a phishing attempt of a certain type is believed to have occurred.

Embodiments of the threat response engine 338 receive sensitivity mitigations, for example, from the distributed server system. In some embodiments, the sensitivity mitigations are received after the snapshot phishing machine learning model assigns a classification, based on the snapshot, to a threat assessment previously classified as "unknown" by the threat assessment engine 308.

Various security mitigations may be taken when a threat is detected, for example, based on the snapshot. A user and/or system administrator 354 may specify the mitigation action taken when a threat is detected. Different mitigation actions may be specified for different threat classifications. One type of mitigation is threat reporting. Useful sensor data and telemetry, as well as snapshots, may be sent to a cloud protection service 350 associated with the operating system vendor to the system administrator 354 associated with an organization (for example, employer) managing the computing device. The same information may be made accessible to a user of the device being monitored. Phishing determinations may also be shared (considering all compliance and privacy guidelines) with a centralized threat protection service 352 that would benefit from leveraging the phishing data to better protect customers from phishing. The threat protection service 352 or any components of the distributed server system 336 may employ the snapshot phishing machine learning model to improve detection and mitigation of phishing attacks.

Figure 4A:
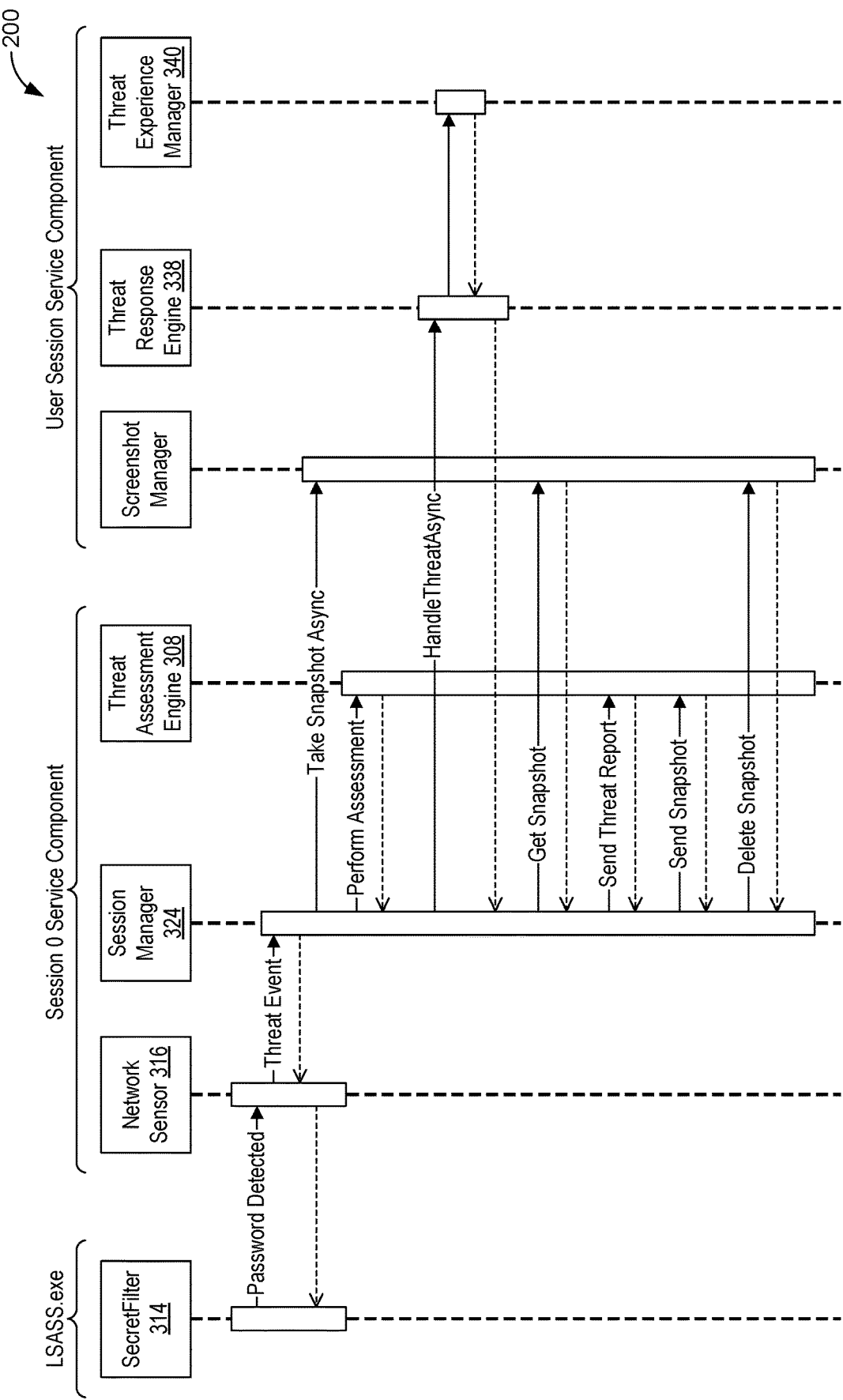
FIGS. 4A and 4B are flow diagrams depicting the interaction of components of the architecture of FIGS. 3A and 3B to detect a phishing website and capture a snapshot, in accordance with an embodiment of the technology described herein.
Figure 4B:
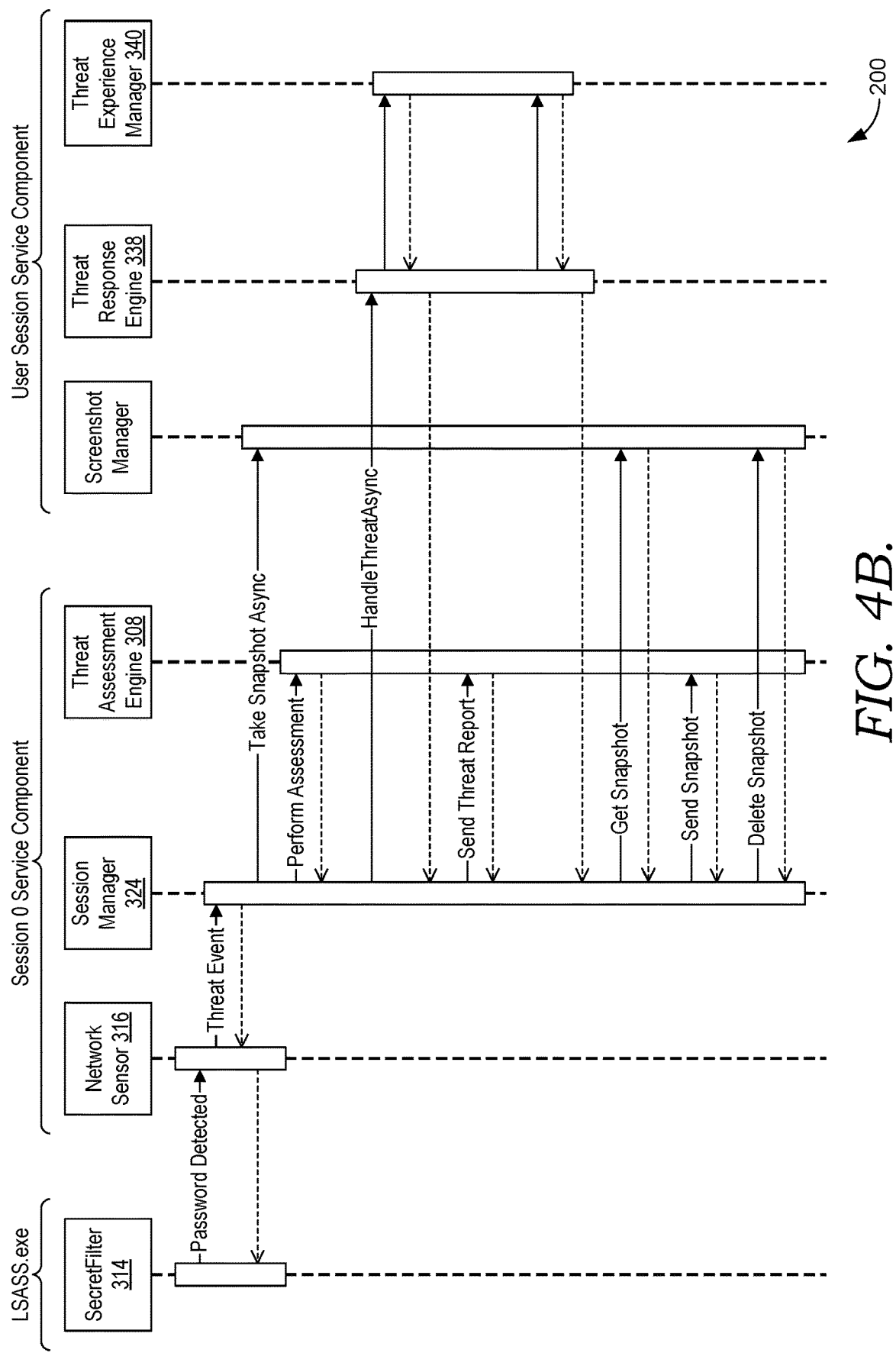

Turning to FIGS. 4A and 4B, depicted are sequence flow diagrams depicting interaction of components of the architecture of FIGS. 3A and 3B to detect a phishing website and capture a snapshot, in accordance with an embodiment of the technology described herein. As illustrated, the secret filter 314 of the LSASS 234 detects a password. In one embodiment, the network sensor 316 communicates detection of the password, along with a present application context and a present network context, as discussed herein. In one example, the network sensor 316 includes or communicates with an office application sensor 319 that detects user activity, such as detection of the password, within an application also proprietary to the owner of the OS 220. For example, suppose the OS corresponds to WINDOWS® 11. In this example, an office application sensor would be a sensor within an OFFICE® 365 application (such as MICROSOFT® word), since both MICROSOFT® deploys or controls both the WINDOWS® 11 OS, as well as the OFFICE® 365 application.

From the password, the session manager 324 identifies a threat event, for example, based on a mismatch between a present network context and an expected network context. As illustrated, the snapshot manager 236 captures a snapshot based on the session manager 324 identifying a threat event. In some embodiments, the snapshot manager 236 does not communicate the captured screenshot until a component requests the screenshot. Instead, in one example, the screenshot is locally cached on the device or a cloud server for a component to retrieve it upon request.

Thereafter, in one embodiment, the threat assessment engine 308 performs threat assessment and communicates the threat assessment to the session manager 324. Thereafter, in one embodiment, the session manager 324 communicates with the threat response engine 338 to implement any security mitigation. In one example, the session manager 324 asynchronously implements the security mitigations discussed herein, among others. In one embodiment, if the threat assessment has resulted in an "unknown" classification or if the distributed server system 336 requests the snapshot, in one embodiment, the session manager 324 obtains the snapshot from the snapshot manager 236. Thereafter, in one embodiment, the session manager sends an updated threat report, including the captured snapshot, to the threat assessment engine 308. FIGS. 4A and 4B differ with respect to the subsequent steps. In one embodiment, the threat dialog is communicated to the threat response engine 338 and then to the session manager 324.

In FIG. 4A, after sending the snapshot to the threat assessment engine 308, embodiments of the session manager 324 cause the snapshot manager 236 to delete the snapshot. In this manner, cache can be cleared or storage space updated to allow for storage of other data, thereby reducing memory strains that would otherwise be caused by storing and not deleting the snapshots.

Alternatively, as illustrated in FIG. 4B, after sending the snapshot to the threat assessment engine 308, the session manager asynchronously causes content to be shown by the threat response engine 338. Example content shown to the user include the example UIs from FIGS. 7 and 8. For example, in FIG. 7, a user is asked if she or he would like to share the snapshot. In response to the user affirming, the session manager 324 shares the snapshot or causes the threat assessment engine 308 to share the snapshot. After the snapshot is shared or sent, for example, to the distributed server system 336, embodiments of the session manager 324 cause the snapshot manager 236 to delete the snapshot.

Figure 6A:
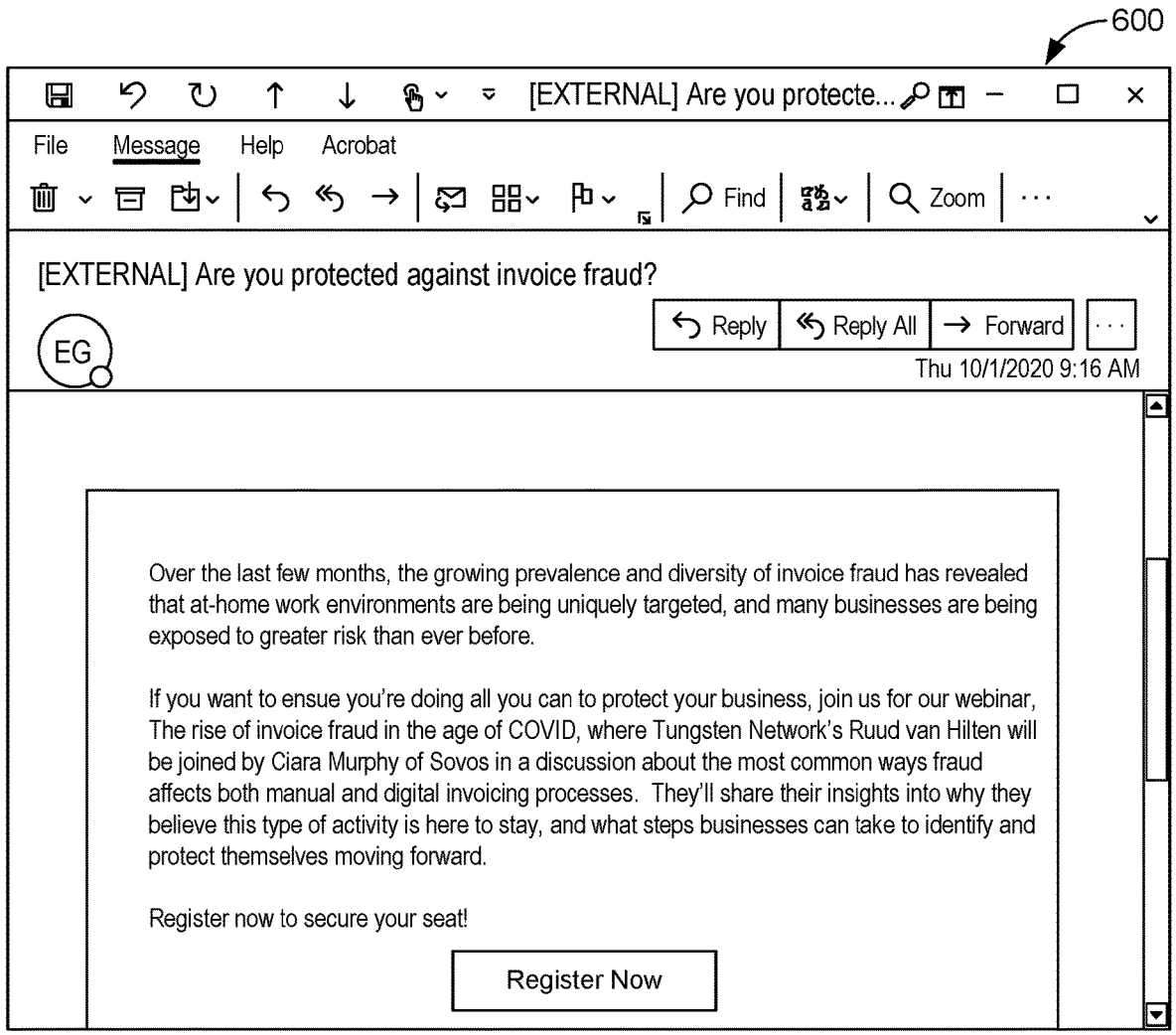
FIGS. 6A, 6B, and 6C are diagrams showing example screenshots of user interfaces during a phishing attempt.
Figure 6B:
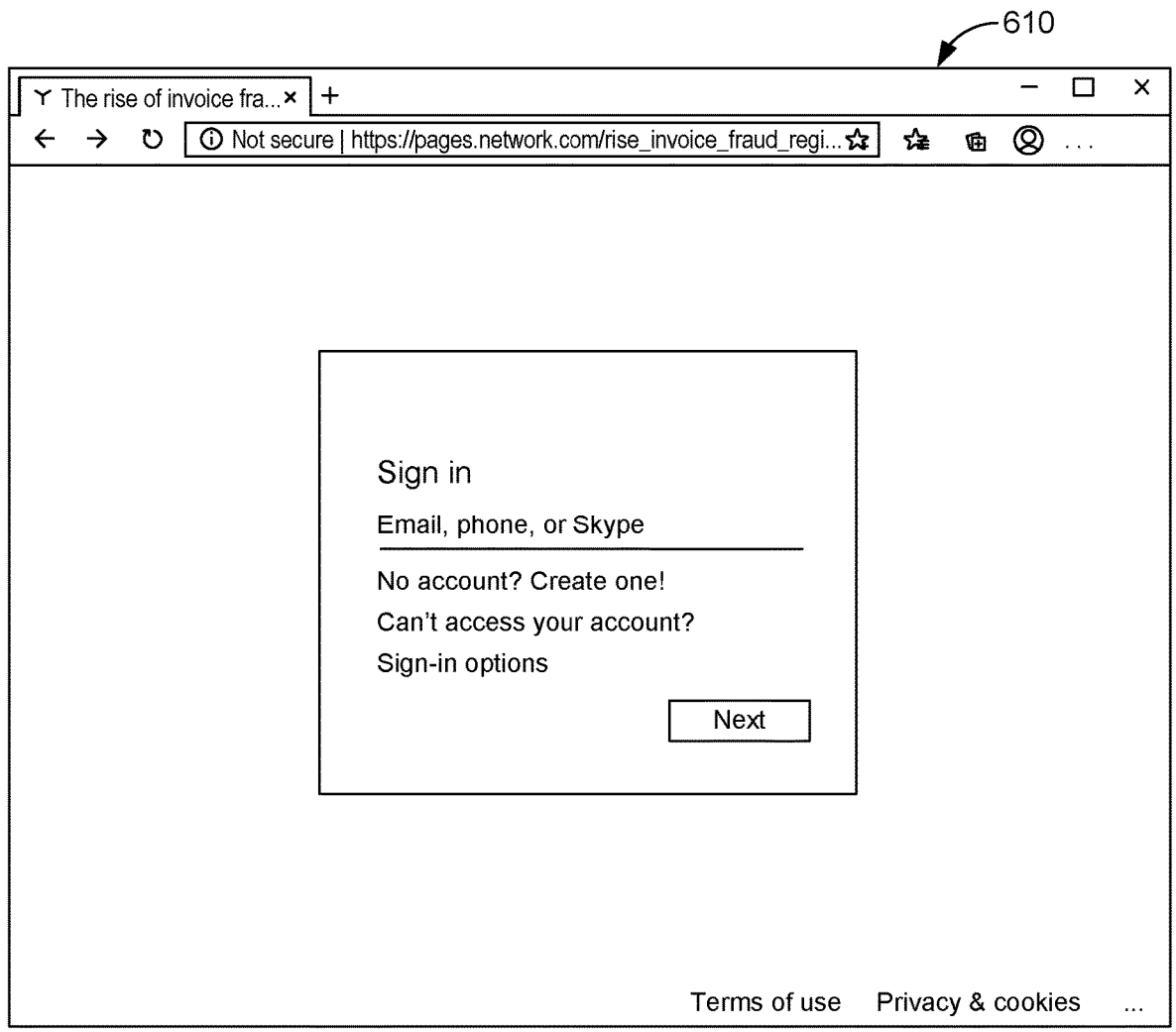
Figure 6C:
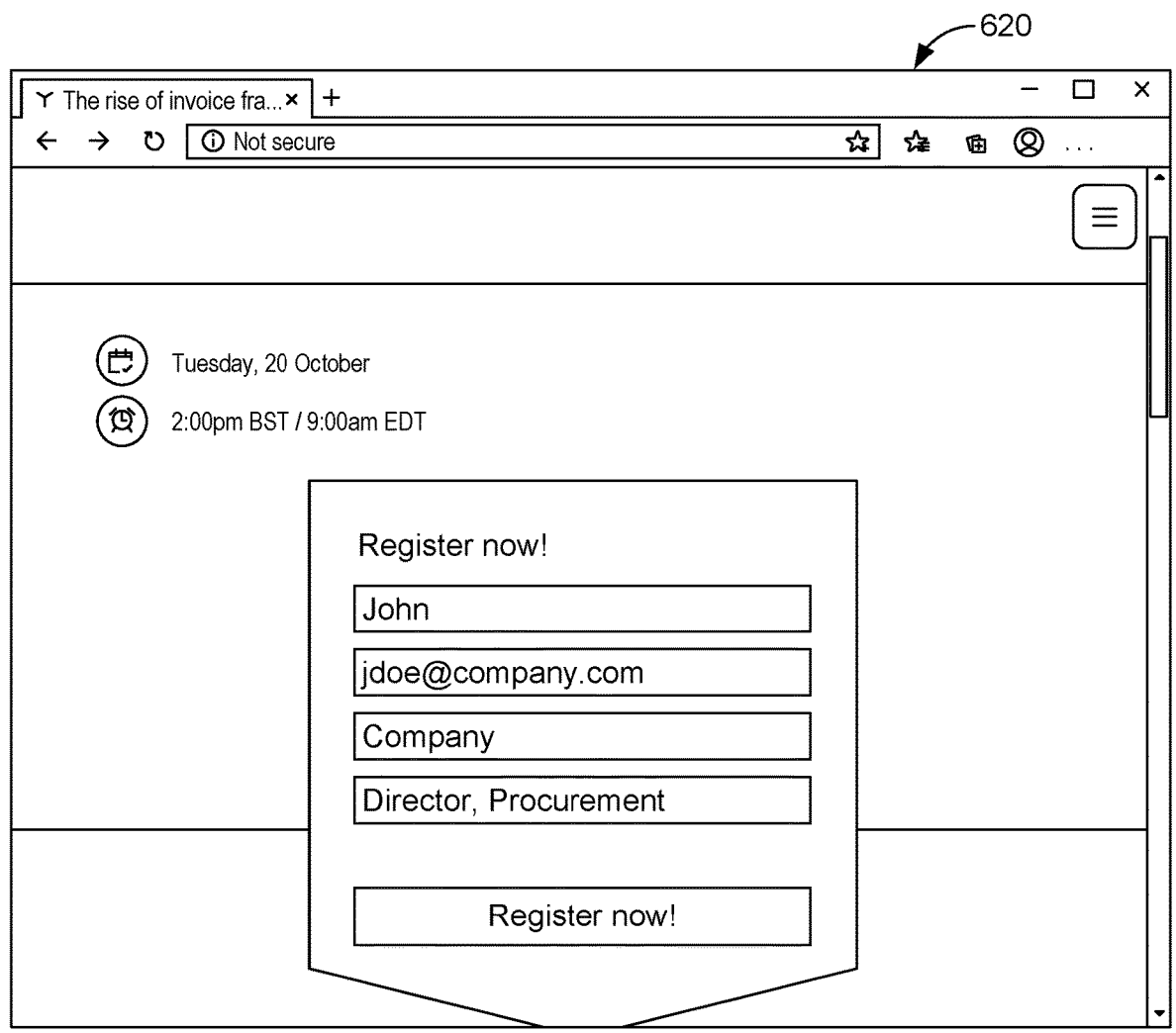

FIGS. 6A, 6B, and 6C illustrate a phishing attack that can be detected by the technology described herein. In FIG. 6A, the user clicks on a "register now" link in an email 600 from a legitimate business. As illustrated, a phishing page 610 opens in FIG. 6B asking for the MICROSOFT® credentials. On a second load, shown in FIG. 6C, the legitimate page 620 opens. This situation may be caused by the trusted company being compromised. A hacker may exploit an A/B testing feature, used by webpage analytics to test different versions of a webpage, to present a phishing page. The technology described herein could identify this attack because the MICROSOFT® account password should not be associated with the trusted webpage. The network context of the browser would show the trusted URL, but this URL would not match a network context associated with the monitored credential. Note also that the browser state may also fail to match an expected state for entry of the monitored credential. A snapshot and its corresponding snapshot features would facilitate identifying this browser state, for example, based on snapshot features, such as the text arrangement "External," indicating that the snapshot is from an external source.

A typical security application might miss this attack because the site certificates could appear to be in order. Further, the security application might not understand which password goes with which service or application. Many security services would not recognize that the password (or other credential) had even been entered. Even then, many security services would not capture a snapshot and leverage the logic and snapshot phishing machine learning model disclosed herein. Moreover, certain security services do not provide users with the level of control and customizability disclosed herein. As described above, FIGS. 7 and 8 depict example screenshots of a user interface allowing a user to select controls for modifying embodiments of the technology described herein.

Figure 9:
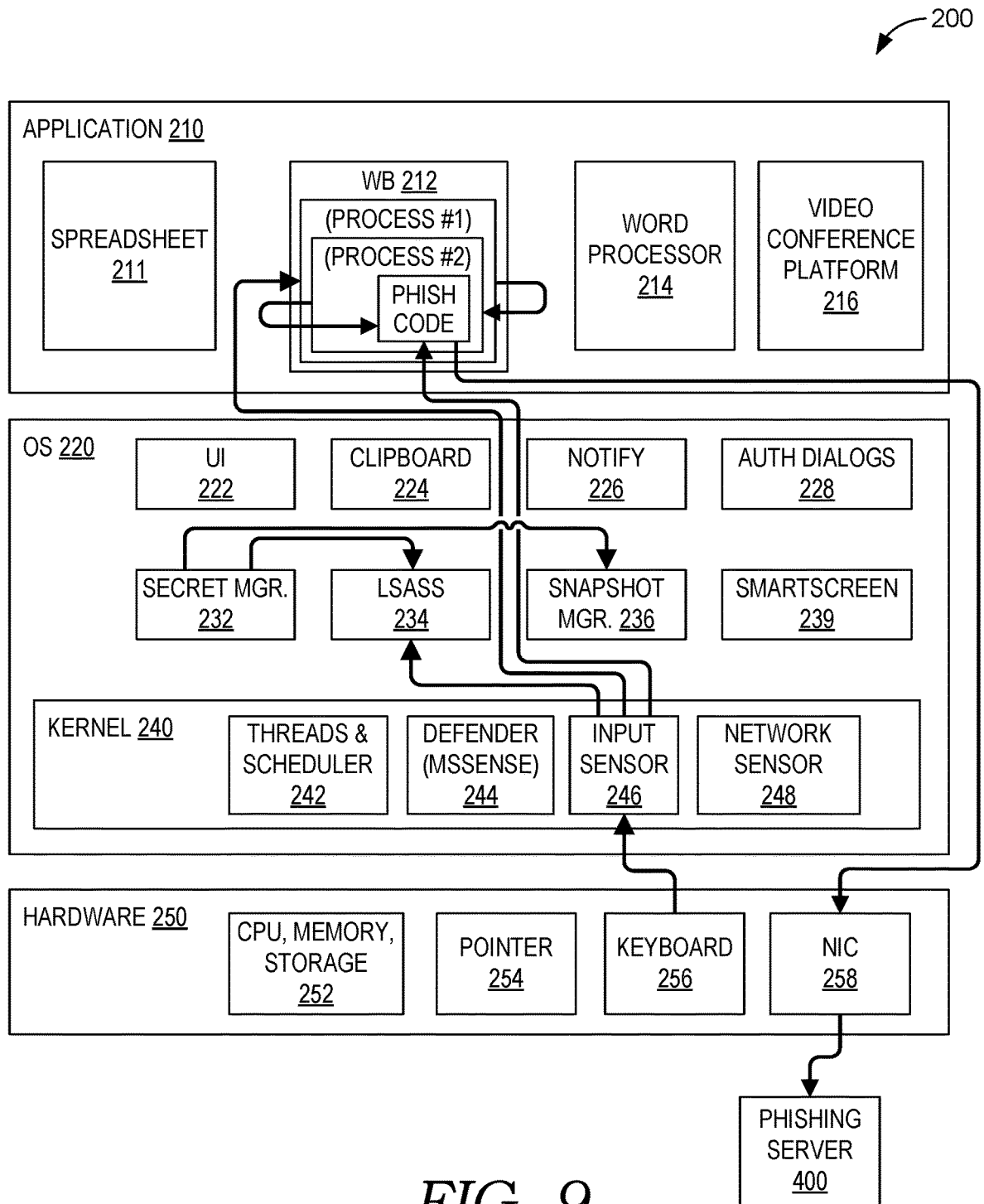
FIG. 9 is a block diagram illustrating activities of components used to detect a phishing website, in accordance with an embodiment of the technology described herein.

Turning now to FIG. 9, the detection of a phishing website is illustrated. Initially, in this example, a series of keystrokes are communicated to the LSASS 234, where the password entry is identified in conjunction with other components, such as the SmartScreen component. As can be seen, the active application is the web browser 212. When the password entry is detected, in this example, a threat assessment is performed and a snapshot is captured by the snapshot manager 236. The snapshot may be captured and locally cached should another component request the snapshot. In this example, the web browser has two processes running. The first process may be a legitimate process that is not a security threat. The second process may have injected phishing code in the input that is communicated to both processes.

In some embodiments, the network context is determined for both processes but the network communications from the phishing code are shown. In one embodiment, these communications that are directed to the phishing server 400 define at least part of the network context. The threat assessment engine 308 (FIG. 3A) may determine that the network address has been associated with a known phishing entity. Because part of the network context involves the address of a known phishing entity, the password entry can be identified as a threat. Note that the phishing code in process may have already fooled a security function running in the web browser. The web browser may not be able to determine the entire network context for the computing device. However, embodiments of the network sensor are able to determine, at the operating system level, the entire network context for the device and identify some network traffic being directed to the phishing component 400. Even if the phishing server 400 had not been on a list of known phishing servers, the threat still could be detected if the network context did not match the expected context for entry of the detected credential. The full context for entry of the detected credential could also include the application context of the web browser, which includes the page being displayed or application being run.

Moreover, in the case where analysis of the network traffic results in an unknown classification of the phishing component 400, the snapshot captured by the snapshot manager 236 can be requested and analyzed for further classification of the phishing attempt. For example, the snapshot of the web browser 212 includes snapshot features, such as font types and branding colors, that do not match those of a safe process running on the browser. In this example, the snapshot would capture these snapshot features and communicate them to the threat assessment engine 308 (FIG. 3A) and/or the distributed server system 336 as discussed herein.

Figure 10:
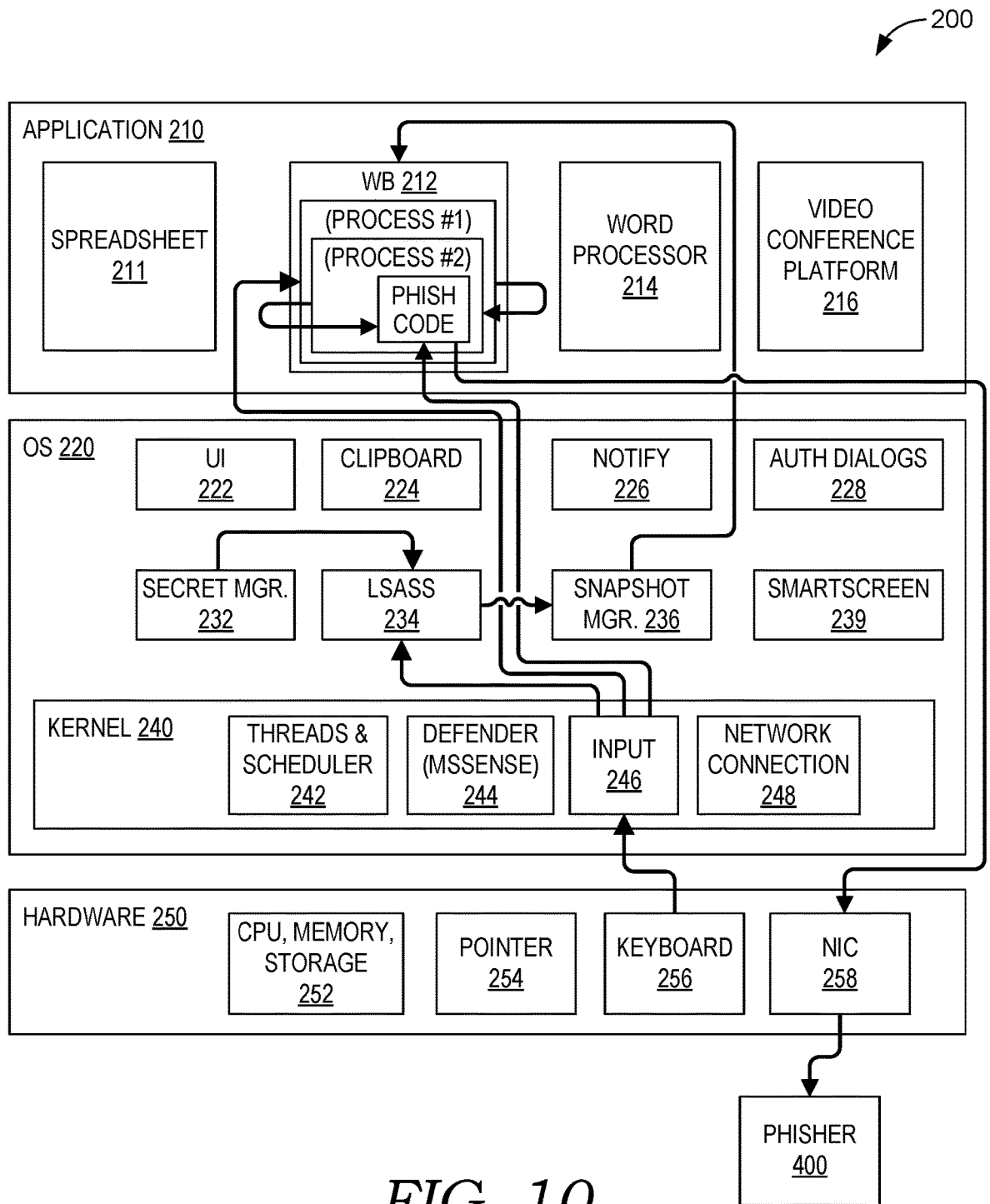
FIG. 10 is a block diagram illustrating activities of components used to detect a man-in-the-middle attack, in accordance with an embodiment of the technology described herein.

Turning now to FIG. 10, the detection of a man-in-the-middle attack is illustrated. A man-in-the-middle attack typically includes two entities: (1) a victim, the entity with which the victim is trying to communicate, and (2) the "man in the middle," who is intercepting the victim's communications. Generally, the victim is not aware of the man in the middle. With a man-in-the-browser attack (MITB), an attacker needs a way to inject malicious software, or malware, into the victim's computer or mobile device. By clicking on a link or opening an attachment in the phishing message, the user can unwittingly load malware onto their device. After clicking on the link or opening the attachment in the phishing message, the malware records the data sent between the victim and specific targeted websites, such as financial institutions, and transmits it to the attacker. The malware in this scenario is the phish code loaded into the browser.

Initially, a series of keystrokes are communicated to the LSASS 234, where the password entry is identified in conjunction with other components, such as the SmartScreen component 239. In this example, the active application is the web browser 212. The arrangement and communications in FIG. 10 are similar to those in FIG. 9, except that in FIG. 9 the attack was based on a phishing website. In FIG. 10, the website is safe, but malware code in the browser copies keystrokes and sends it to a destination, such as the phishing server 400, that is not appropriate for the application context and could also be on an identified phishing list.

By employing the snapshot manager 236 disclosed herein, the snapshot of the phishing message or UI element associated with the malicious link or attachment can be captured and communicated to improve malware classification and threat assessment. For example, the captured snapshot could cause the distributed server system 336 to notify the user, at or near real-time, to not open the link or attachment in the phishing message.

Figure 11:
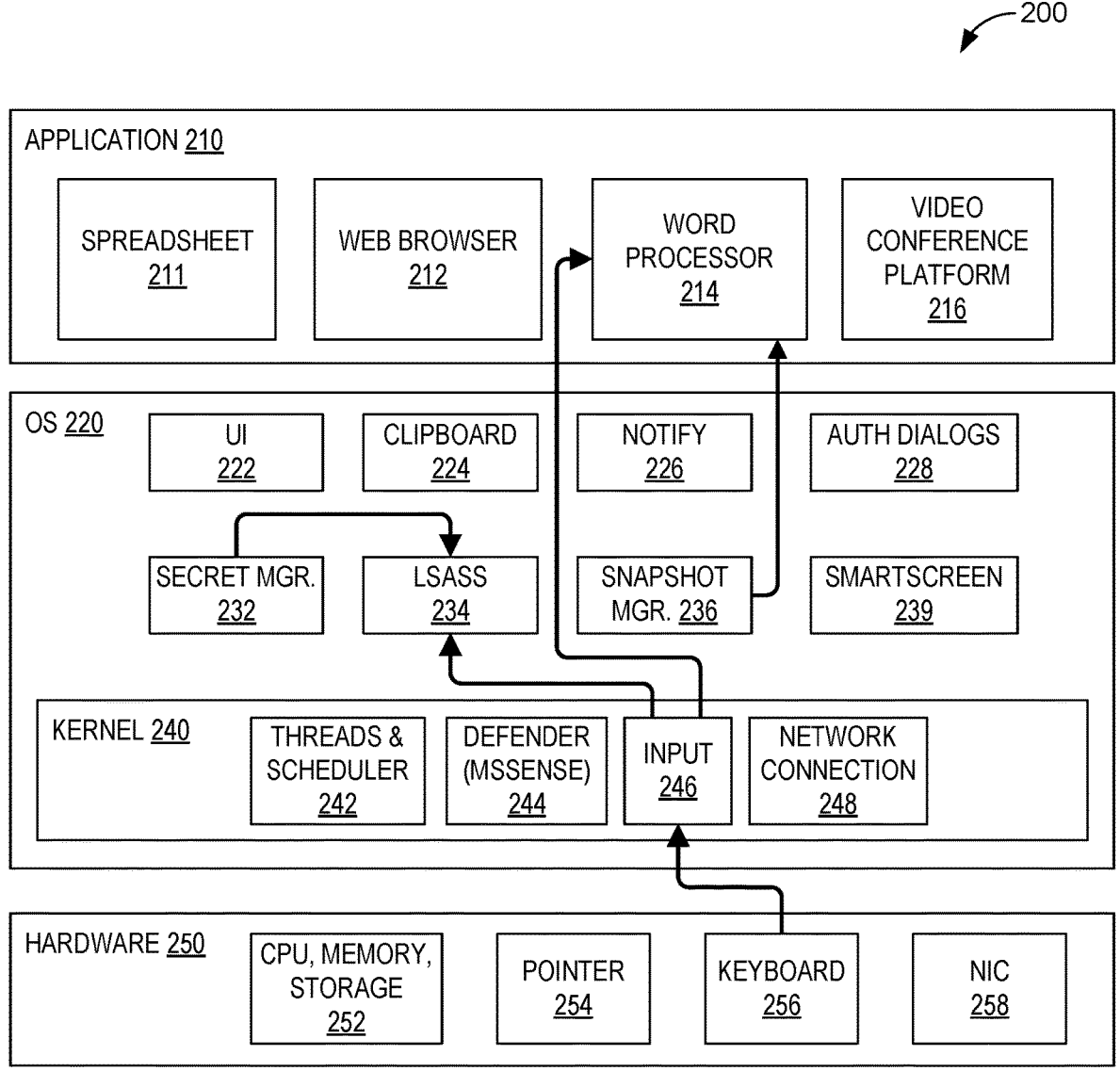
FIG. 11 is a block diagram illustrating activities of components used to detect a phishing attempt through a word processor application, in accordance with an embodiment of the technology described herein.

Turning now to FIG. 11, the detection of a phishing attack in a document is illustrated. Initially, in this example, a series of keystrokes are communicated to the LSASS 234, where the password entry is identified in conjunction with other components, such as the SmartScreen component 239. As can be seen, the active application is the word processing application 214. In this scenario, a network context may not be involved. Simply detecting the user entering a password in a document, even as plain text, may be enough to identify a threat. In other words, no context for the application may exist where entry of a password is appropriate. In other situations, such as when the application is provided as a service, then entry of a password may be appropriate in certain contexts. In these situations, the stored application state consistent with password entry can be compared with the actual state when the password is entered to determine whether a threat is present. In some cases, this might just be a bad safety practice by the user rather than a phishing attack. However, phishing attacks can occur through documents and other files containing macros that generate a phishing interface. The interface may ask for a credential to open the document or take some other action. The macro can collect the credential and communicate it via email or some other method. In some embodiment, capturing a snapshot of the application in which the user is entering the password provides additional details, such as snapshot features, that further classify and improve threat assessment.

Figure 12:
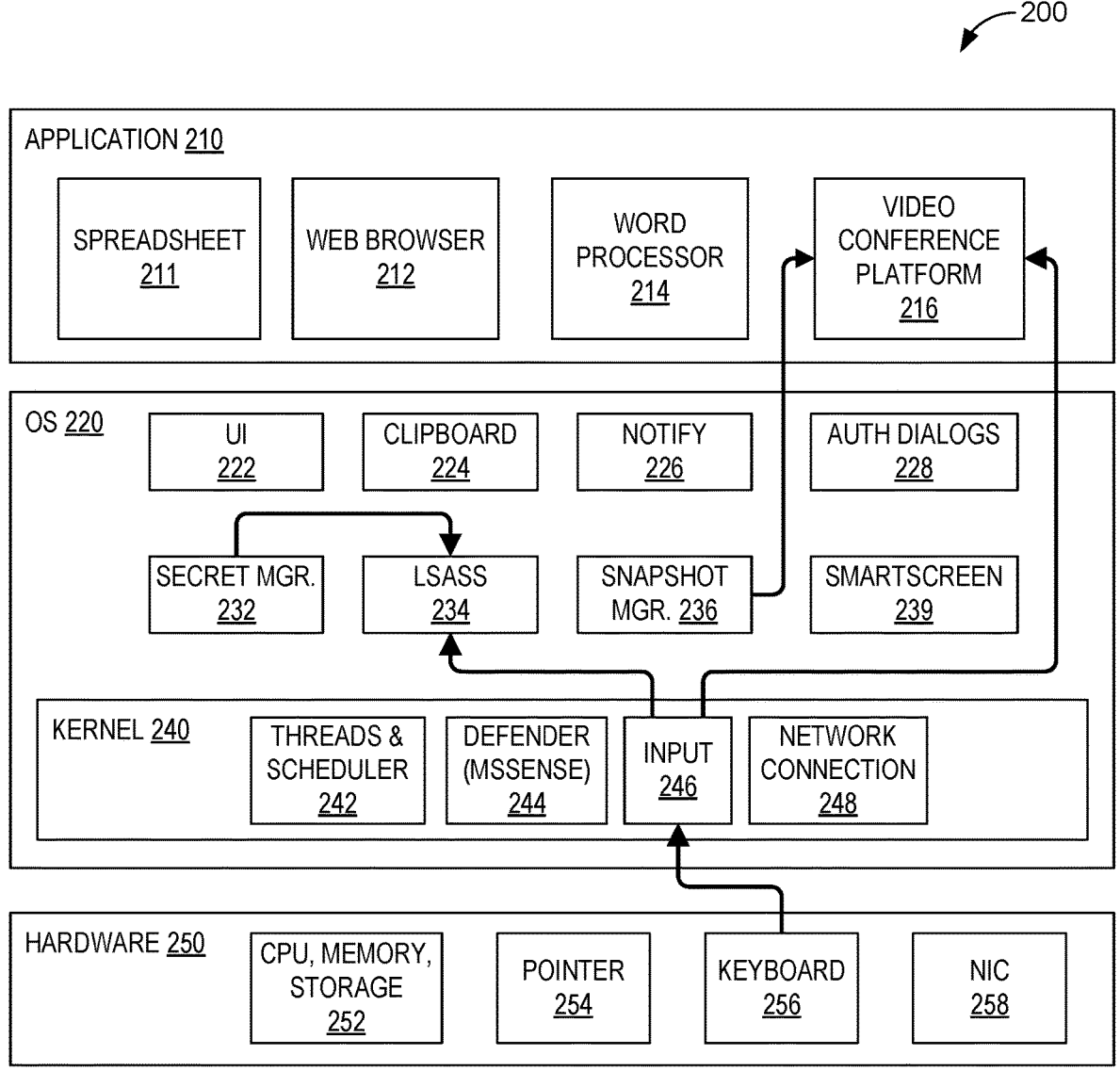
FIG. 12 is a block diagram illustrating activities of components used to detect a phishing attack through a video conference platform, in accordance with an embodiment of the technology described herein.

Turning now to FIG. 12, the detection of a phishing attack in a video platform is illustrated. Initially, in this example, a series of keystrokes are communicated to the LSASS 234, where the password entry is identified in conjunction with other components, such as the SmartScreen component. In some embodiments, the snapshot is captured during entry of the password, although the snapshot is not communicated until requested, for example, by the distributed server system (FIG. 3). As can be seen, the active application is the video conference platform 216. In this scenario, a network context may not be involved. Simply detecting the user entering a password in a chat may be enough to identify a threat. In other words, no context for the application may exist where entry of a password is appropriate. In other situations, such as when the application is provided as a service, then entry of a password may be appropriate in certain contexts. In these situations, the stored application state consistent with password entry can be compared with the actual state when the password is entered to determine whether a threat is present. The captured snapshot may provide an indication of the actual state. In some cases, this might just be a bad safety practice by the user rather than a phishing attack. However, phishing attacks can occur through video chats, such as when an entity is posing as technical support. Macros on the platform could also generate interfaces that ask for a password. The interface may ask for a credential to join a meeting, make a recording, or take some other action. The macro can collect the credential and communicate it via email or some other method. In some embodiment, capturing a snapshot of the application on which the user is entering the password provides additional details, such as snapshot features, that further classify and improve threat assessment.

Figure 13:
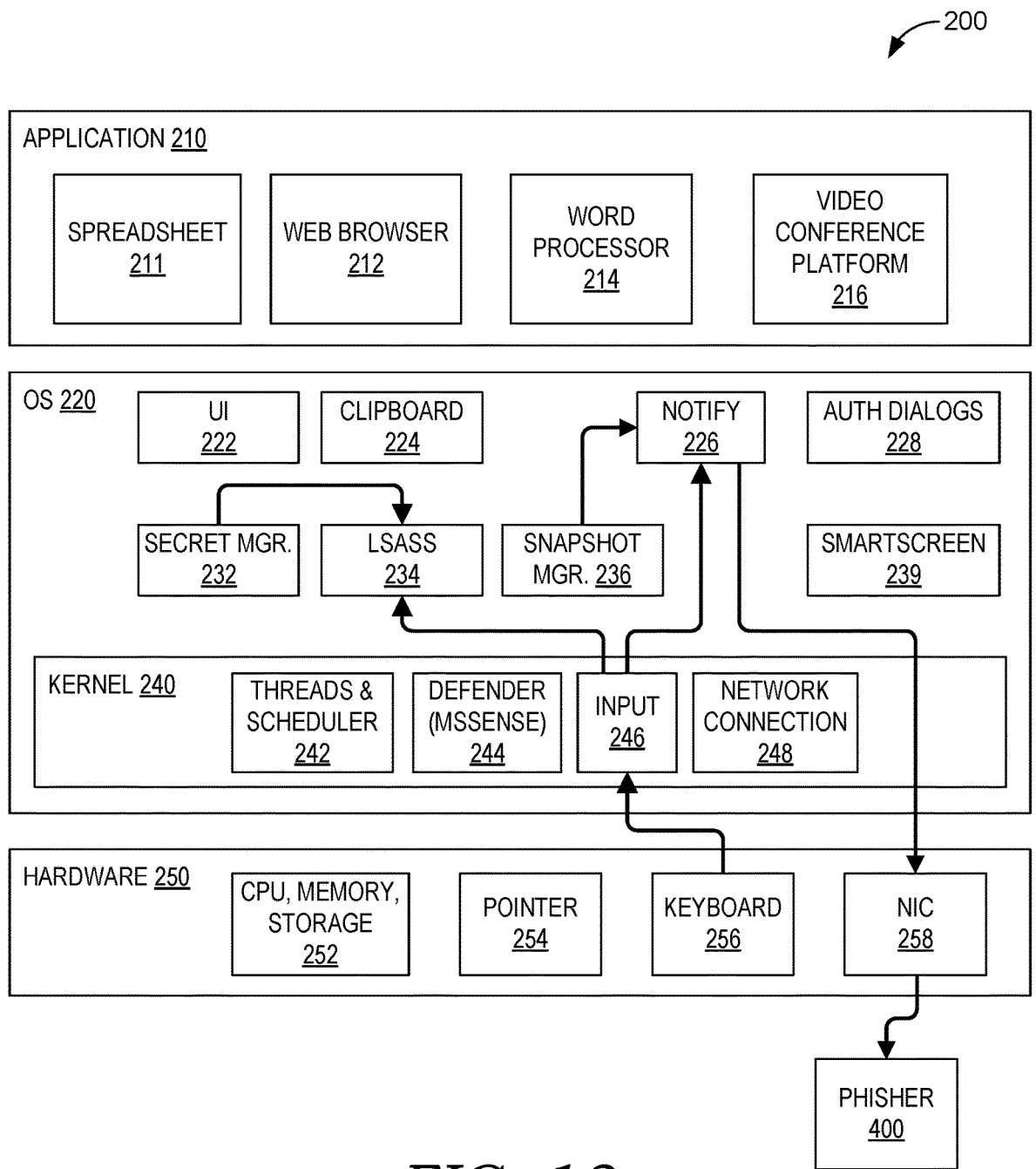
FIG. 13 is a block diagram illustrating activities of components used to detect a phishing attack through an operating system notification, in accordance with an embodiment of the technology described herein.

Turning now to FIG. 13, the detection of a phishing attack in an operating system notification is illustrated. Initially, a series of keystrokes are communicated to the LSASS 234, where the password entry is identified in conjunction with other components, such as the SmartScreen component 239. As can be seen, the active function is the operating system notification function 226. Some legitimate notifications may ask the user to enter credentials, for example, after the token generated by a previous password entry expires. The network context may be determined and a snapshot captured. Notice that communications directed to the phishing server 400 define, at least, part of the network context. Interaction with the notification includes certain snapshot features captured by the snapshot manager 236. The threat assessment engine 308 (FIG. 3) may determine that the network address has been associated with a known phishing entity. Because part of the network context involves the address of a known phishing entity, the password entry can be identified as a threat. However, when the network context still results in an unknown classification by the threat assessment engine 308, a snapshot is captured and communicated to the threat assessment engine 308 or the distributed server system 336. With the technology described herein, a snapshot may provide additional visual details, such as snapshot features, that are not identifiable by the network sensor at the operating system level. In this manner, more information is obtained to improve threat detection, classification, and mitigation. This allows the phishing attempt to be correctly identified and mitigated. Even if the phishing server 400 and corresponding visual identifiers have not been on a list of known phishing servers or malicious content, the threat still could be detected if the snapshot features included features that correlated or corresponded to another known phishing server or malicious content associated with similar snapshot features. The full context for entry of the detected credential could also include the application context and the network context of the notification, which includes the application that requested or triggered the notification and network activity, respectively.

Figure 14:
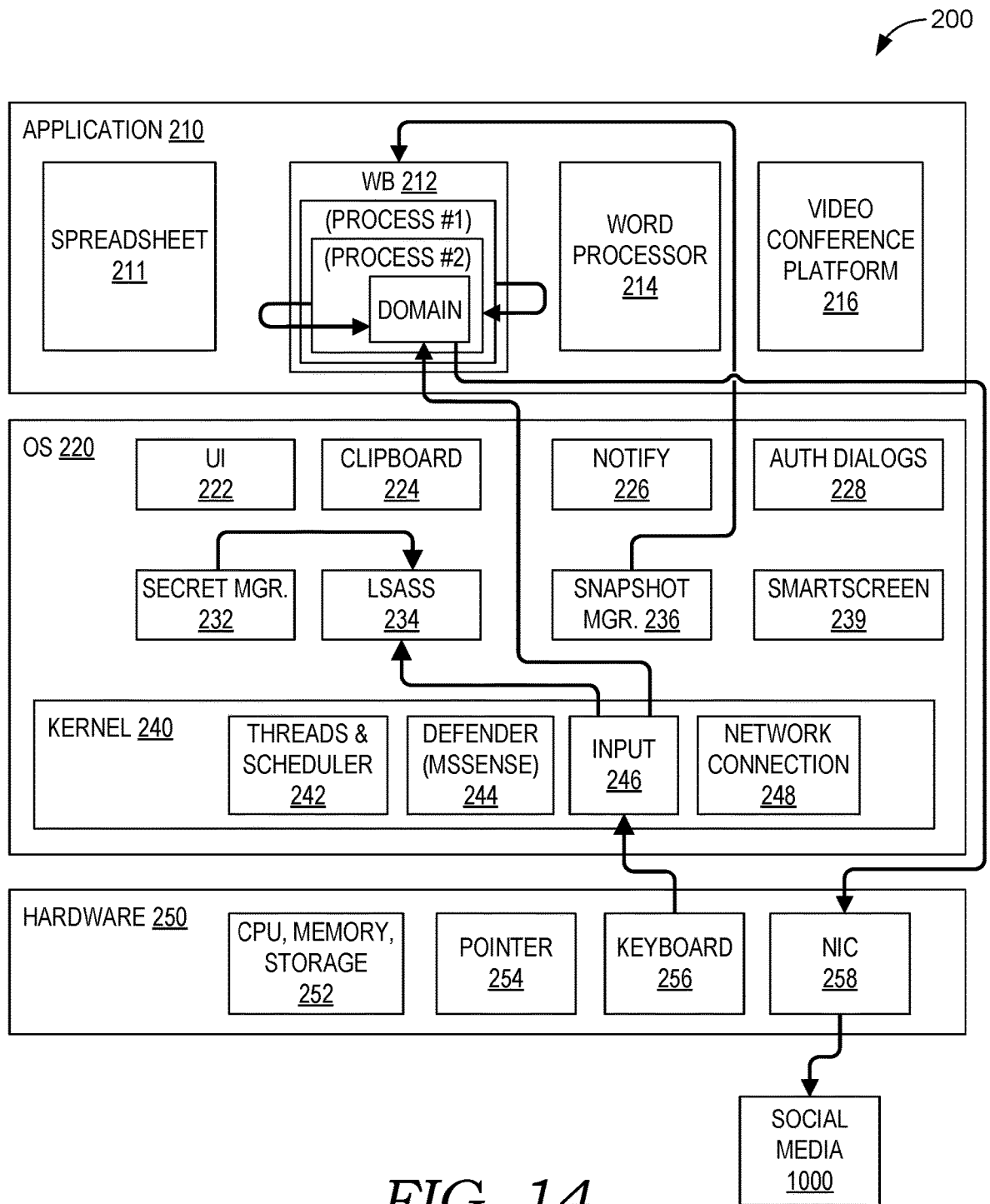
FIG. 14 is a block diagram illustrating activities of components used to detect password reuse, in accordance with an embodiment of the technology described herein.

Turning now to FIG. 14, the detection of password reuse is illustrated. Initially, a series of keystrokes are communicated to the LSASS 234, where the password entry is identified in conjunction with other components, such as the SmartScreen component. As can be seen, the active application is the web browser 212. When the password entry is detected, a threat assessment is performed. The web browser has two processes running, but in this case both are legitimate.

The network context may be determined for both processes. The threat assessment engine 308 (FIG. 3) may identify that the network address is from a trusted source, but not a trusted source associated with the password. This may indicate password reuse, which occurs when a person uses the same password with multiple accounts. To verify the identity of the source, the snapshot manager 236 could capture a snapshot. If the threat assessment engine 308 determines the identity of the source to a threshold percent of certainty, the snapshot would not be needed and would be deleted. On the other hand, if the threat assessment engine 308 determines the identity of the source below a threshold percent of certainty, the snapshot could be requested and then deleted. In this case, a mitigation step could include notifying the user and a system administrator.

Figure 15:
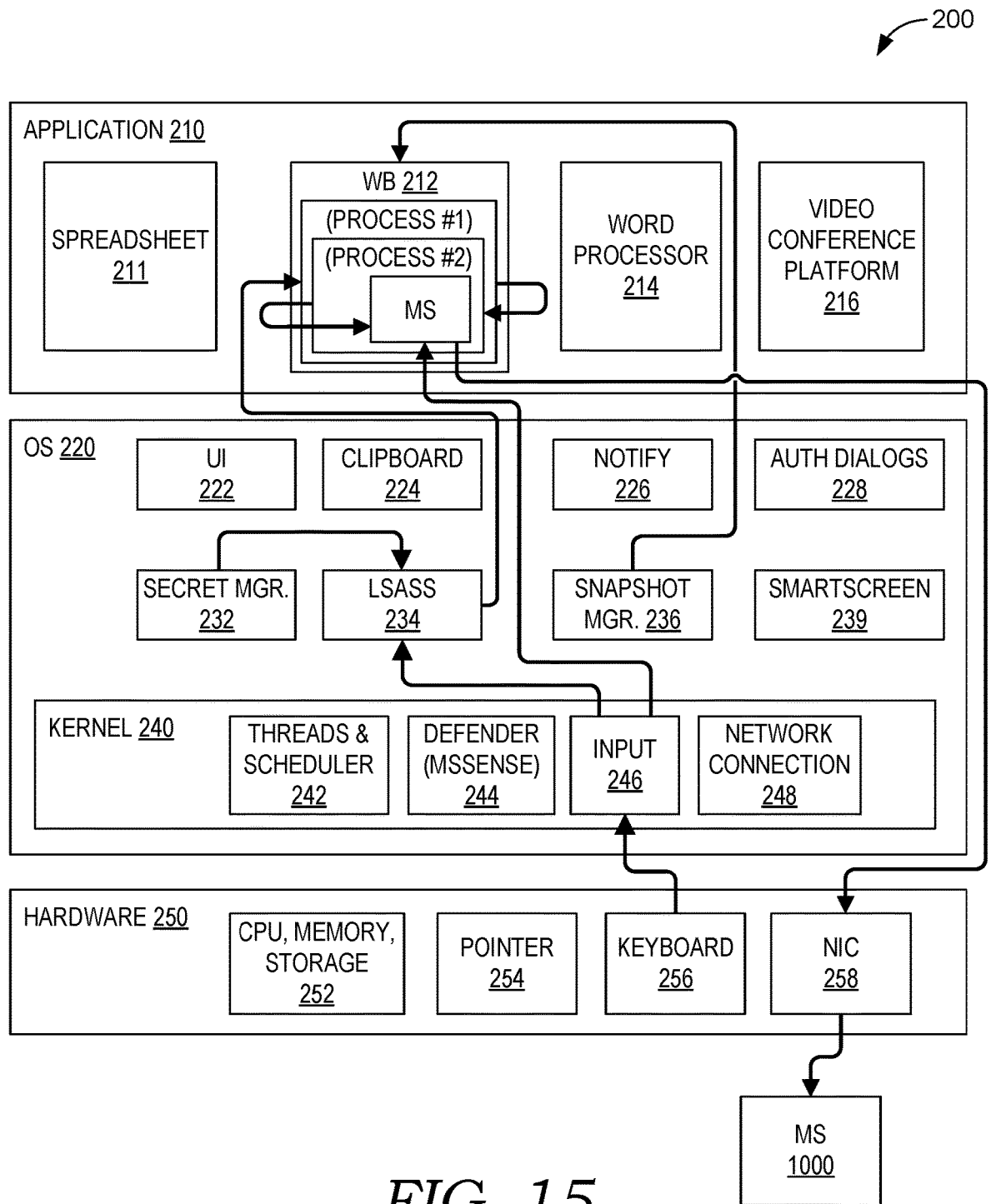
FIG. 15 is a block diagram illustrating activities of components used to confirm correct password use, in accordance with an embodiment of the technology described herein.

Turning now to FIG. 15, the detection of non-threatening password use is illustrated. Initially, a series of keystrokes are communicated to the LSASS 234, where the password entry is identified in conjunction with other components, such as the SmartScreen component 239. As can be seen, the active application is the web browser 212. When the password entry is detected, a threat assessment is performed. The web browser has two processes running, but in this case, both are connected to legitimate authentication sites. The network context may be determined for both processes. The threat assessment engine may identify that the network address is from a trusted source, or that the network address is the source expected to be used with the password. To verify the identity of the web browser 212, the snapshot manager 236 could capture a snapshot. If the threat assessment engine 308 determines the identity of the web browser 212 to a threshold percent of certainty, the snapshot would not be needed and would be deleted. On the other hand, if the threat assessment engine 308 determines the identity of the web browser 212 below a threshold percent of certainty, the snapshot could be requested and then deleted. In this situation, no mitigation needs to be taken, but the snapshot and the application and network context may be gathered to help refine the correct network and application context for use of the password.

Example Methods

Figure 16:
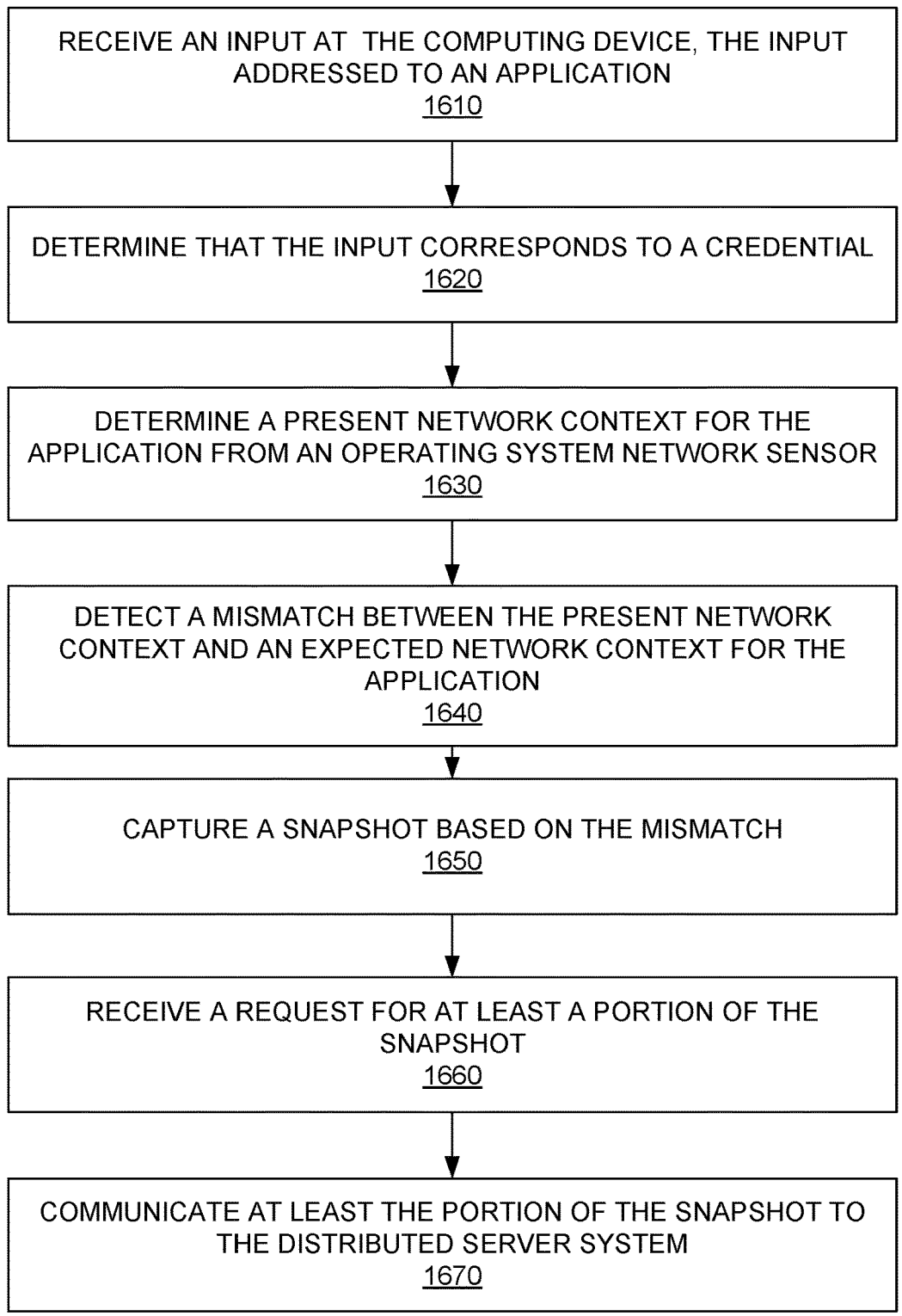
FIG. 16 is a flow diagraph showing a method of capturing and communicating a snapshot to a distributed server system, in accordance with an embodiment of the technology described herein.
Figure 18:
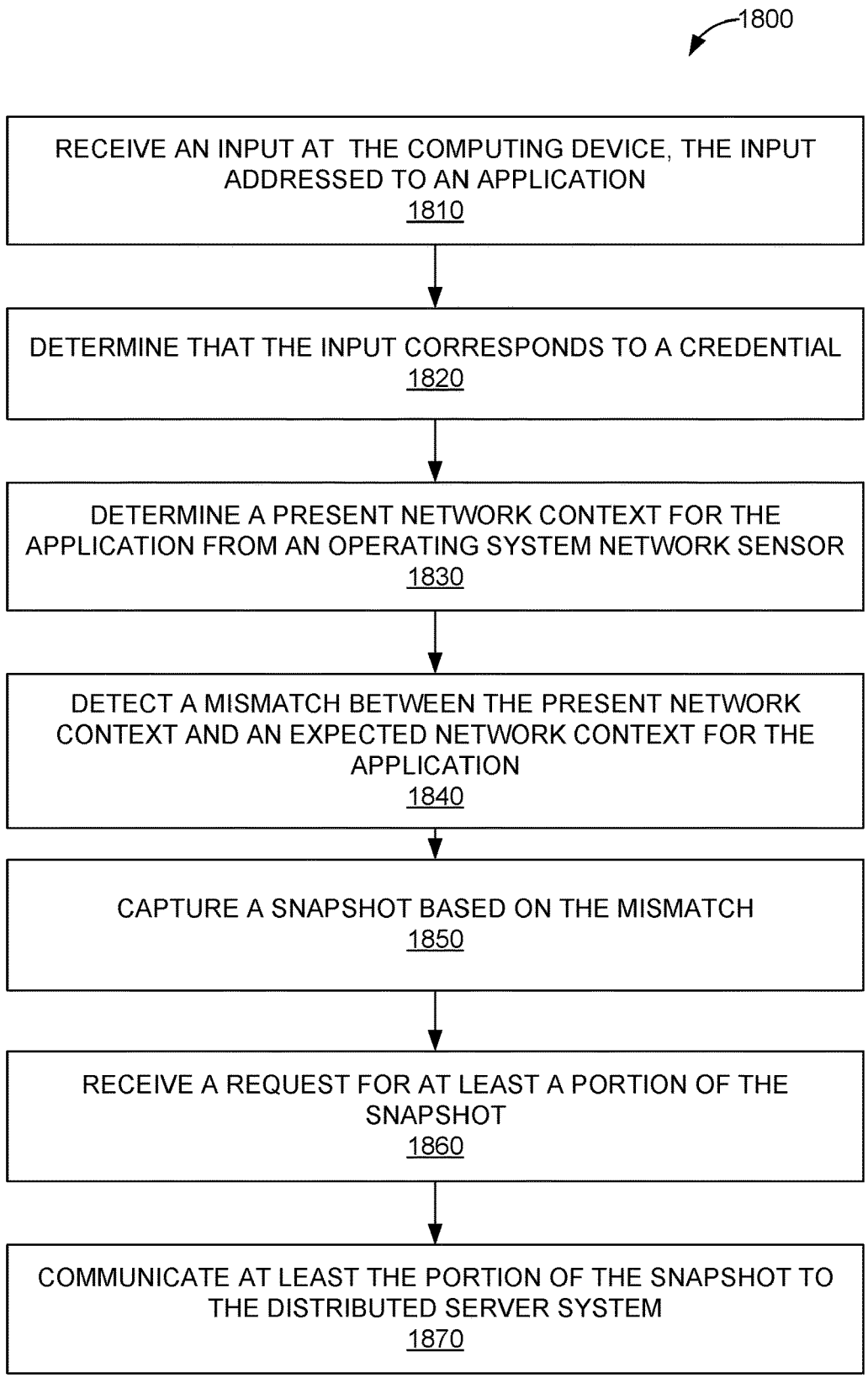
FIG. 18 is a flow diagraph showing a method of capturing and communicating a snapshot to a distributed server system, in accordance with an embodiment of the technology described herein.
Figure 19:
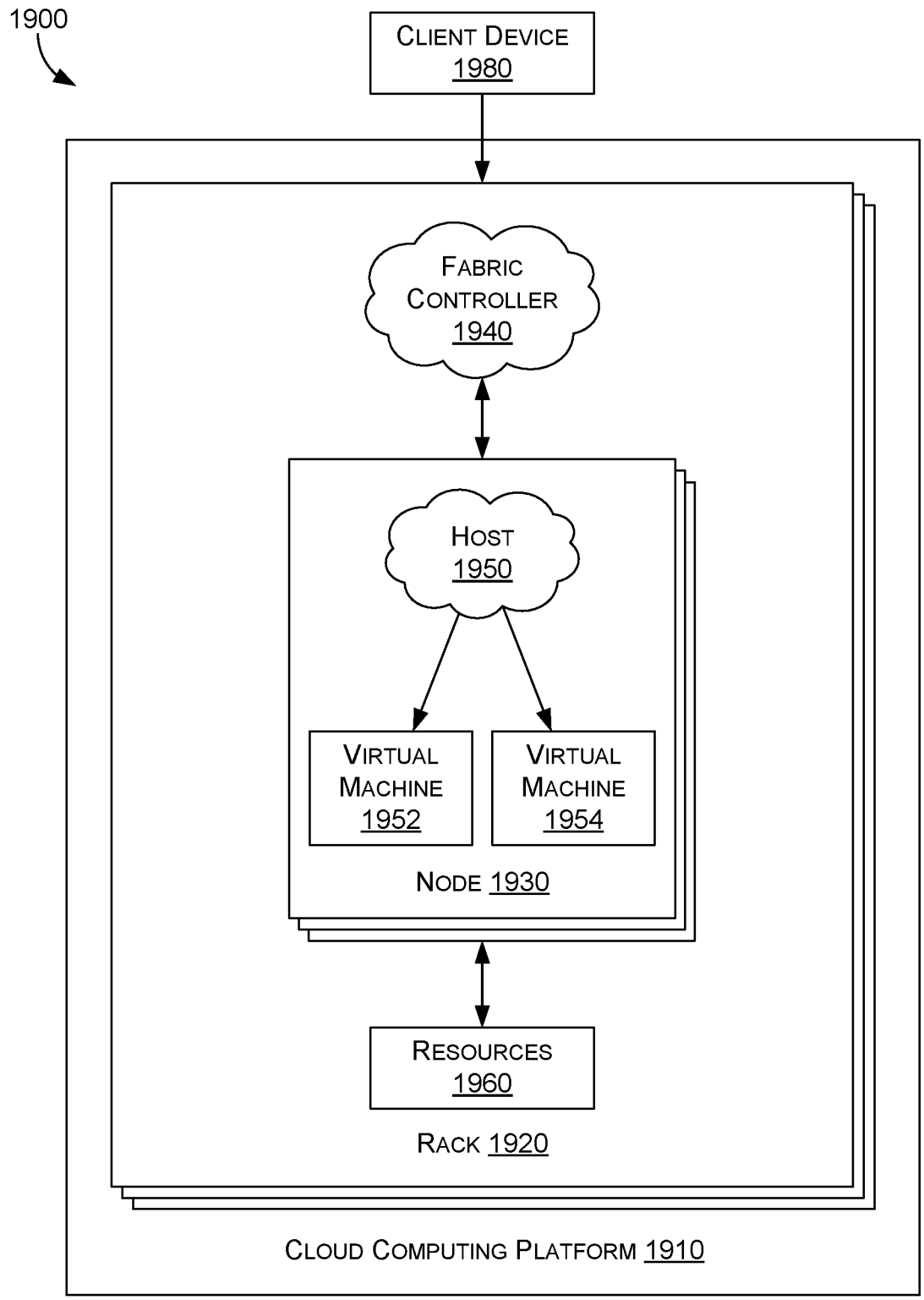
FIG. 19 is a block diagram of an example computing environment suitable for use in implementing aspects of the technology described herein.

Now referring to FIGS. 16, 18, and 19, each block of methods 1600, 1800, and 1900, described herein, comprises a computing process that may be performed using any combination of hardware, firmware, and/or software. For instance, various functions may be carried out by a processor executing instructions stored in memory. The methods may also be embodied as computer-usable instructions stored on computer-storage media. The method may be provided by an operating system. In addition, methods 1600, 1800, and 1900 are described, by way of example, with respect to FIGS. 1-15. However, these methods may additionally or alternatively be executed by any one system or any combination of systems, including, but not limited to, those described herein.

FIG. 16 is a flow diagram showing a method 1600 for capturing and communicating a snapshot to a distributed server system 336 (FIG. 3), in accordance with some embodiments of the present disclosure. Method 1600 could be performed on or with systems similar to those described with reference to FIGS. 1-15. For example, method 1600 is performed by one or more operating system components.

The method 1600, at block 1610, includes receiving an input for the computing device. The input may be a textual input comprising characters, numbers, and symbols. In one embodiment, a textual input is received from a hard or soft keyboard, or from the clipboard. The technology described herein analyzes the user input received at the operating system level. The textual input may be entered through a real or virtual keyboard or through other means (for example, a gesture interface, or speech-to-text). The textual input may be received from a hardware driver for the input device used to originate the characters of the textual input. The textual input is addressed to an application running on the computing system. The textual input may be communicated from the operating system to an application. The textual input is directed to an application rather than directly to the operating system. The operating system communicates the textual input to the application.

The method 1600, at block 1620, includes determining that the textual input corresponds to a credential. As described previously, this step may be performed by an operating system component. Initially, a credential, such as a username or password, is registered with the threat detection system. Embodiments of the technology described herein are not limited for use with a username or password. A credential may be any type of secret or confidential information, such as Social Security numbers, credit card information, driver's license numbers, or passport IDs, that could be monitored by the system described herein. In one embodiment, a username and password for the operating system is automatically registered. A user interface may be provided for a user or other individual (for example, system administrator) to register additional credentials for monitoring.

The registered credentials are associated with the user in a credential data store, which may be described as a credential manager herein, and may be associated with a local operating system. In one embodiment, a hash of the credential is stored rather than the credential. In embodiments, a hash of the credential is generated using a first function and is stored for comparison with a hash generated from a user input. The technology described herein will perform a threat assessment when a credential entry is detected, without the credential or credential hash leaving the local operating system.

The technology described herein intercepts user input at the operating system level, generates a hash of the input, and compares it with a hash of a credential being monitored. In one embodiment, a hash of the last n characters received is generated where n is the character length of the credential. For example, a hash of the last eight characters entered may be generated and compared to a hash of an eight-character password. In another embodiment, hashes of less than the full credential are generated and used to detect potential entry of a credential before the entry is complete. For example, a hash of four characters, five characters, six characters, and seven characters could be generated in order to anticipate the entry of an eight-character password. In this scenario, the input strings are hashed at the character lengths that match hashes of partial credentials stored in the credential manager.

A credential entry is detected when a hash for the character string entered matches a hash for a credential being monitored. A potential credential entry is detected when a hash of the character string entered matches a hash for a partial credential.

The method 1600, at block 1630, includes determining a present network context for the application from an operating system network sensor 316 (FIG. 3A). As described previously, this step may be performed by an operating system component. A network sensor 316 may receive network status information from a kernel network sensor 318 (FIG. 3A) and possibly other operating system components. The network status information may include the URL, an IP address, a process ID, an SNI, domain information (for example, domain name), and other characteristics of the ongoing communication sessions between outside resources.

The method 1600, at block 1640, includes detecting a mismatch between the present network context and an expected network context for the application. As described previously, this step may be performed by an operating system component. One or more attributes of the present network context and the expected network context may be compared to detect the mismatch.

The method 1600, at block 1650, includes capturing, at the operating system, a snapshot based on the mismatch between the present network context and an expected network context for the application. In this case, the mismatch can mean the credential entry is not being completed in a normal context. The abnormal context indicates a threat to the security or confidentiality of the credential. As described previously, this step may be performed by an operating system component. In one embodiment, the threat is detected by analyzing a series of rules that define threats. These rules may result in assignment of a classification to the detected credential entry. Among other possible classifications, the threat assessment may classify the credential input unknown. Embodiments of the snapshot manager 236 (FIGS. 2A and 2B) capture and format the snapshot.

The method 1600, at block 1660, includes receiving a request for at least a portion of the snapshot. As described above, the threat assessment may result in the credential input corresponding to an unknown threat classification. To determine additional contextual information, a distributed server system 336 can request a snapshot to try to re-classify the credential input and perform another threat assessment. The method 1600, at block 1670, includes communicating the portion of the snapshot to the distributed server system. In this manner, the threat assessment may be improved and reclassified based on snapshot features extracted from the snapshot.

Figure 17:
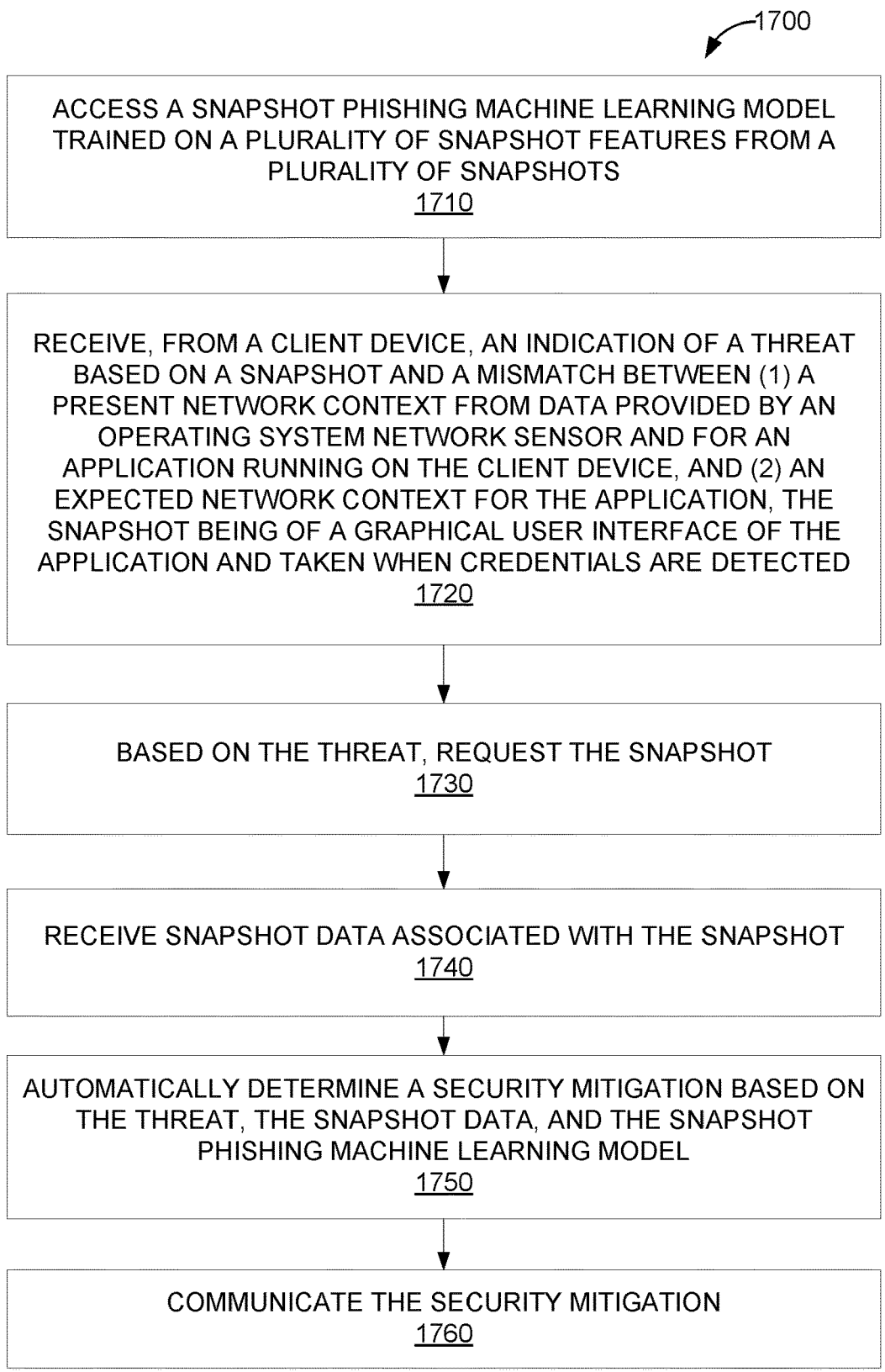
FIG. 17 is a flow diagraph showing a method of determining and communicating a security mitigation based at least on snapshot data of the snapshot, in accordance with an embodiment of the technology described herein.

FIG. 17 is a flow diagram showing a method 1700 for determining and communicating a security mitigation based at least on snapshot data of the snapshot, in accordance with some embodiments of the present disclosure. Method 1600 could be performed on or with systems similar to those described with reference to FIGS. 1-15. For example, method 1700 is performed by one or more operating system components.

The method 1700, at block 1710, includes accessing a snapshot phishing machine learning model trained on a plurality of snapshot features from a plurality of snapshots.

The method 1700, at block 1720 includes receiving, from a client device, an indication of a threat based on a snapshot and a mismatch between (1) a present network context, and (2) an expected network context for the application. The snapshot may include a portion of a screenshot of a GUI of the application. In one embodiment, the present network context is from data received from an operating system network sensor and for an application running on the client device. In some embodiments, the threat is classified based on the mismatch. In one embodiment, the snapshot phishing machine learning model classifies the threat based on the mismatch.

The method 1700, at block 1730, includes requesting a snapshot of a graphical user interface of the application taken when credentials were input into the client device. In one embodiment, the snapshot is requested based on the threat being classified as an unknown threat. In one embodiment, the snapshot is requested in a particular format, size, or other image parameters. The method 1700, at block 1740, includes receiving snapshot data associated with the snapshot. In one embodiment, the snapshot is received based on the requested image parameters.

The method 1700, at block 1750, includes automatically determining a security mitigation, based on the threat, the snapshot data, and the snapshot phishing machine learning model. The method 1700, at block 1760, includes communicating the security mitigation. As described previously, this step may be performed by an operating system component. Various mitigation actions may be taken when a threat is detected. A threat classification based on the snapshot may trigger a mitigation action, such as blocking communication of the credential to the URL or suspension of the credential.

A user and/or system administrator may specify the mitigation action taken when a threat is detected. Different mitigation actions may be specified for different threat classifications. One type of mitigation is threat reporting. Useful sensor data, snapshot data, and telemetry may be sent to a cloud protection service associated with the operating system vendor, to a system administrator associated with an organization (for example, employer) managing the computing device. The same information may be made accessible to a user of the device being monitored. Phishing determinations may also be shared (considering all compliance and privacy guidelines) with a centralized threat protection service that would benefit from leveraging the phishing data to better protect customers from phishing.

The mitigation actions can also include user awareness efforts. From the user perspective, the phishing protection may have generic (not application-specific) user interfaces that allow for blocking phishing attempts, changing passwords, warning about detected risks, phishing education, and social engineering training. These last two options may appeal to enterprises that would like to deliver targeted additional security training to end-users. Application specific user interfaces can also be used. The communication of threat detection information could be enabled via a public API.

FIG. 18 is a flow diagram showing a method 1800 for capturing and communicating a snapshot to a distributed server system 336 (FIG. 3), in accordance with some embodiments of the present disclosure. Method 1800 could be performed on or with systems similar to those described with reference to FIGS. 1-15. For example, method 1800 is performed by one or more operating system components.

The method 1800, at block 1810, includes receiving an input for the computing device. The input may be a textual input comprising characters, numbers, and symbols. In one embodiment, a textual input is received from a hard or soft keyboard. The technology described herein analyze the user input received at the operating system level. The textual input may be entered through a real or virtual keyboard or through other means (for example, a gesture interface, or speech-to-text). The textual input may be received from a hardware driver for the input device used to originate the characters of the textual input. The textual input is addressed to an application running on the computing system. The textual input may be communicated from the operating system to an application. The textual input is directed to an application rather than directly to the operating system. The operating system communicates the textual input to the application.

The method 1800, at block 1820, includes determining that the textual input corresponds to a credential. As described previously, this step may be performed by an operating system component. Initially, a credential, such as a username or password, is registered with the threat detection system. Embodiments of the technology described herein are not limited for use with a username or password. A credential may be any type of secret or confidential information, such as Social Security numbers, credit card information, driver's license numbers, or passport IDs, that could be monitored by the system described herein. In one embodiment, a username and password for the operating system is automatically registered. A user interface may be provided for a user or other individual (for example, system administrator) to register additional credentials for monitoring.

The registered credentials are associated with the user in a credential data store, which may be described as a credential manager herein, and may be associated with a local operating system. In one embodiment, a hash of the credential is stored rather than the credential. In embodiments, a hash of the credential is generated using a first function and is stored for comparison with a hash generated from a user input. The technology described herein will perform a threat assessment when a credential entry is detected, without the credential or credential hash leaving the local operating system.

The technology described herein intercepts user input at the operating system level, generates a hash of the input, and compares it with a hash of a credential being monitored. In one embodiment, a hash of the last n characters received is generated where n is the character length of the credential. For example, a hash of the last eight characters entered may be generated and compared to a hash of an eight-character password. In another embodiment, hashes of less than the full credential are generated and used to detect potential entry of a credential before the entry is complete. For example, a hash of four characters, five characters, six characters, and seven characters could be generated in order to anticipate the entry of an eight-character password. In this scenario, the input strings are hashed at the character lengths that match hashes of partial credentials stored in the credential manager.

A credential entry is detected when a hash for the character string entered matches a hash for a credential being monitored. A potential credential entry is detected when a hash of the character string entered matches a hash for a partial credential.

The method 1800, at block 1830, includes determining a present network context for the application from an operating system network sensor 316 (FIG. 3A). As described previously, this step may be performed by an operating system component. A network sensor 316 may receive network status information from a kernel network sensor 318 (FIG. 3A) and possibly other operating system components. The network status information may include the URL, an IP address, a process ID, an SNI, domain information (for example, domain name), and other characteristics of the ongoing communication sessions between outside resources.

The method 1800, at block 1840, includes detecting a mismatch between the present network context and an expected network context for the application. As described previously, this step may be performed by an operating system component. One or more attributes of the present network context and the expected network context may be compared to detect the mismatch.

The method 1800, at block 1850, includes capturing, at the operating system, a snapshot based on the mismatch between the present network context and an expected network context for the application. In this case, the mismatch can mean the credential entry is not being completed in a normal context. The abnormal context indicates a threat to the security or confidentiality of the credential. As described previously, this step may be performed by an operating system component. In one embodiment, the threat is detected by analyzing a series of rules that define threats. These rules may result in assignment of a classification to the detected credential entry. Among other possible classifications, the threat assessment may classify the credential input unknown. Embodiments of the snapshot manager 236 (FIGS. 2A and 2B) capture and format the snapshot.

The method 1800, at block 1860, includes receiving a request for at least a portion of the snapshot. As described above, the threat assessment may result in the credential input corresponding to an unknown threat classification. To determine additional contextual information, a distributed server system 336 can request a snapshot to try to re-classify the credential input and perform another threat assessment. The method 1800, at block 1870, includes communicating the portion of the snapshot to the distributed server system. In this manner, the threat assessment may be improved and reclassified based on snapshot features extracted from the snapshot.

Exemplary Operating Environment

Referring now to FIG. 19, FIG. 19 illustrates an example distributed computing environment 1900 in which implementations of the present disclosure can be employed. In one embodiment, the distributed computer environment 1900 corresponds to aspects of the distributed server system 336 (FIG. 3). FIG. 19 shows a high level architecture of an example cloud computing platform 1910 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1900 that includes cloud computing platform 1910, rack 1920, and node 1930 (for example, computing devices, processing units, or blades) in rack 1920. The technical solution environment can be implemented with cloud computing platform 1910 that runs cloud services across different data centers and geographic regions. Cloud computing platform 1910 can implement fabric controller 1940 component for provisioning and managing resource allocation, deployment, upgrade, and management of cloud services. Typically, cloud computing platform 1910 acts to store data or run service applications in a distributed manner. Cloud computing infrastructure 1910 in a data center can be configured to host and support the operation of end points of a particular service application. Cloud computing infrastructure 1910 may be a public cloud, a private cloud, or a dedicated cloud.

Node 1930 can be provisioned with host 1950 (for example, operating system or runtime environment) running a defined software stack on node 1930. Node 1930 can also be configured to perform specialized functionality (for example, compute nodes or storage nodes) within cloud computing platform 1910. Node 1930 is allocated to run one or more portions of a service application of a tenant. A tenant can refer to a customer utilizing resources of cloud computing platform 1910. Service application components of cloud computing platform 1910 that support a particular tenant can be referred to as a multi-tenant infrastructure or tenancy. The terms "service application," "application," or "service" are used interchangeably herein and broadly refer to any software or portions of software that run on top of, access storage, and compute device locations within a datacenter.

When more than one separate service application is being supported by nodes 1930, nodes 1930 may be partitioned into virtual machines (for example, virtual machine 1952 and virtual machine 1954). Physical machines can also concurrently run separate service applications. The virtual machines or physical machines can be configured as individualized computing environments that are supported by resources 1960 (for example, hardware resources and software resources) in cloud computing platform 1910. It is contemplated that resources can be configured for specific service applications. Further, each service application may be divided into functional portions such that each functional portion is able to run on a separate virtual machine. In cloud computing platform 1910, multiple servers may be used to run service applications and perform data storage operations in a cluster. In particular, the servers may perform data operations independently but be exposed as a single device, referred to as a cluster. Each server in the cluster can be implemented as a node.

Client device 1980 may be linked to a service application in cloud computing platform 1910. Client device 1980 may be any type of computing device, which may correspond to computing device 2000 described with reference to FIG. 20. For example, client device 1980 is configured to issue commands to cloud computing platform 1910. In embodiments, client device 1980 communicates with service applications through a virtual Internet Protocol (IP) and load balancer, or through other means that direct communication requests to designated end points in cloud computing platform 1910. The components of cloud computing platform 1910 may communicate with each other over a network (not shown), which may include, without limitation, one or more local area networks (LANs) and/or wide area networks (WANs).

Figure 20:
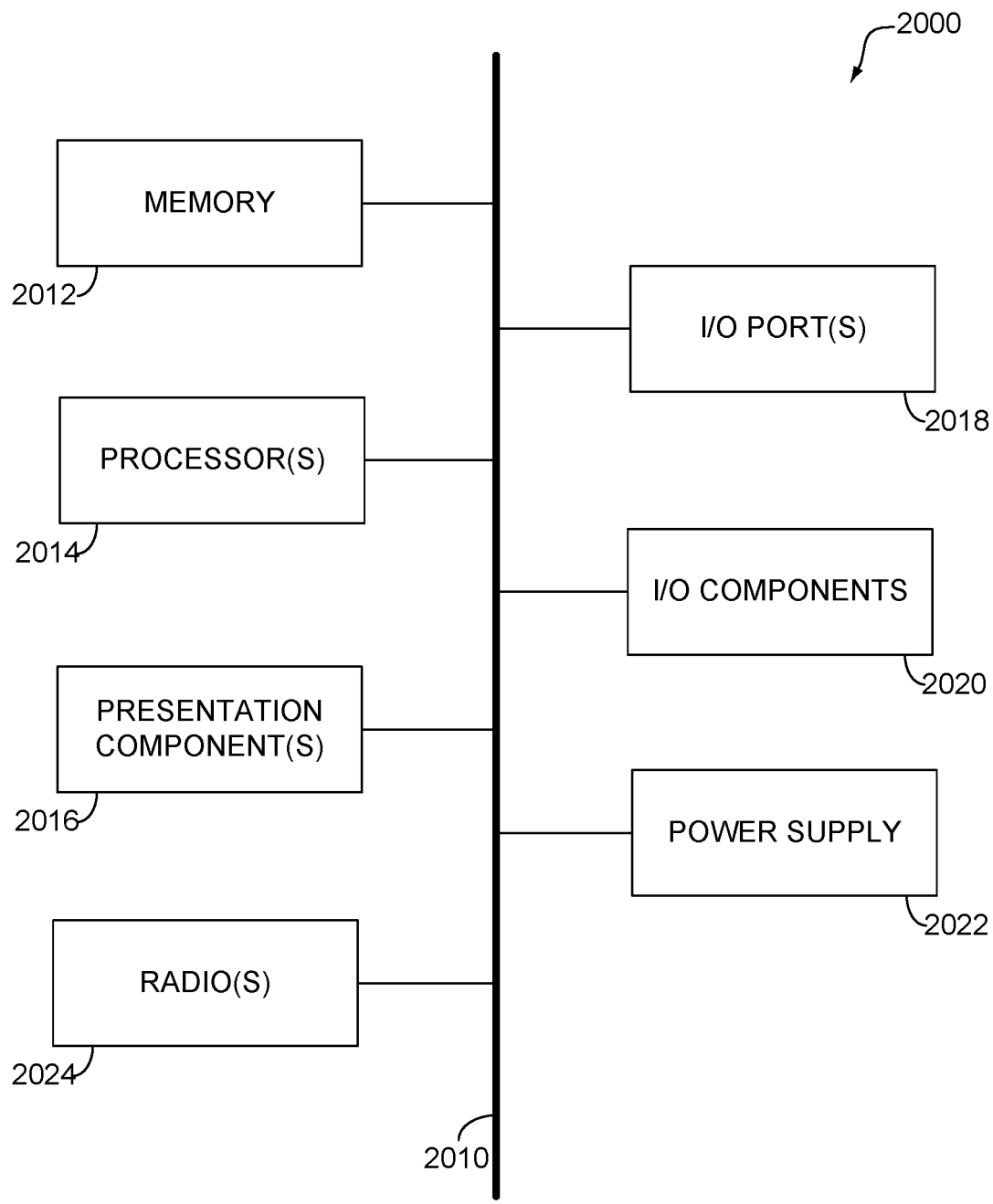
FIG. 20 is a block diagram illustrating a computing device suitable for use with embodiments of the technology described herein.

Referring to the drawings in general, and initially to FIG. 20 in particular, an exemplary operating environment for implementing embodiments of the technology described herein is shown and designated generally as computing device 2000. Computing device 2000 is but one example of a suitable computing environment and is not intended to suggest any limitation as to the scope of use of the technology described herein, and neither should the computing device 2000 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Embodiments of the technology described herein may also be practiced in distributed computing environments where tasks are performed by remote-processing devices that are linked through a communications network.

With continued reference to FIG. 20, computing device 2000 includes a bus 2010 that directly or indirectly couples the following devices: memory 2012, one or more processors 2014, one or more presentation components 2016, input/output (I/O) ports 2018, I/O components 2020, and an illustrative power supply 2022. Bus 2010 represents what may be one or more buses (such as an address bus, data bus, or a combination thereof). Although the various blocks of FIG. 20 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 20 is merely illustrative of an exemplary computing device that may be used in connection with one or more embodiments of the technology described herein. Distinction is not made between such categories as "workstation," "server," "laptop," "handheld device," etc., as all are contemplated within the scope of FIG. 20 and refer to "computer" or "computing device."

Computing device 2000 typically includes a variety of computer-readable media. Computer-readable media may be any available media that may be accessed by computing device 2000 and includes both volatile and non-volatile, removable and non-removable media. By way of example, and not limitation, computer-readable media may comprise computer-storage media and communication media. Computer-storage media includes both volatile and non-volatile, removable and non-removable media implemented in any method or technology for storage of information such as computer-readable instructions, data structures, program modules, or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer-storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer-readable media.

Memory 2012 includes computer-storage media in the form of volatile and/or non-volatile memory. The memory 2012 may be removable, non-removable, or a combination thereof. Exemplary memory includes solid-state memory, hard drives, optical-disc drives, etc. Computing device 2000 includes one or more processors 2014 that read data from various entities such as bus 2010, memory 2012, or I/O components 2020. As used herein, the term processor or "a processer" may refer to more than one computer processor. For example, the term processor (or "a processor") may refer to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 2016 present data indications to a user or other device. Exemplary presentation components 2016 include a display device, speaker, printing component, vibrating component, etc. I/O ports 2018 allow computing device 2000 to be logically coupled to other devices, including I/O components 2020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 2014 may be direct or via a coupling utilizing a serial port, parallel port, and/or other interface and/or system bus known in the art. Furthermore, the digitizer input component may be a component separated from an output component such as a display device, or, in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 2000. These requests may be transmitted to the appropriate network element for further processing. An NUI implements any combination of speech recognition, touch and stylus recognition, facial recognition, biometric recognition, gesture recognition (both on screen and adjacent to the screen), air gestures, head and eye tracking, and touch recognition associated with displays on the computing device 2000. The computing device 2000 may be equipped with depth cameras, such as stereoscopic camera systems, infrared camera systems, red-green-blue (RGB) camera systems, and combinations of these, for gesture detection and recognition. Additionally, the computing device 2000 may be equipped with accelerometers or gyroscopes that enable detection of motion. The output of the accelerometers or gyroscopes may be provided to the display of the computing device 2000 to render immersive augmented reality or virtual reality.

A computing device may include a radio 2024. The radio 2024 transmits and receives radio communications. The computing device may be a wireless terminal adapted to receive communications and media over various wireless networks. Computing device 2000 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (for example, mobile hotspot) that provides access to a wireless communications network, such as a WLAN connection using the 802.11 protocol. A Bluetooth connection to another computing device is a second example of a short-range connection. A long-range connection may include a connection using one or more of CDMA, General Packet Radio Service (GPRS), GSM, TDMA, and 802.16 policies.

Embodiments

In some embodiments, a computer-implemented method is provided and is implemented using any of the embodiments described herein. The computer-implemented method includes receiving, via a graphical user interface and at the computing device, an input addressed to an application; determining that the input corresponds to a credential; determining a present context for the application from data received from an operating system network sensor; and detecting a mismatch between the present context and an expected context for the application. The mismatch corresponds to an unknown threat classification. The computer-implemented method further includes capturing a snapshot of the graphical user interface based on the mismatch; receiving a request for at least a portion of the snapshot based on the unknown threat classification; and communicating, according to the request, at least the portion of the snapshot to a distributed server system.

Advantageously, technical effects of these and other embodiments, as described herein, employ a snapshot to receive and use additional details relevant to the classification of the threat, thereby reducing previous threat assessments resulting in an unknown classification. Moreover, to reduce latency, preserve computation resources, and avoid overloading a network bandwidth, embodiments of the technology described herein request the captured snapshot in certain instances. For example, the snapshot is captured when the threat assessment provides the "unknown classification." Thereafter, in one example, the snapshot is communicated for further analysis. In this manner, network bandwidth is conserved by not automatically communicating every snapshot. Locally, in some embodiments, the snapshot is deleted after a period of time or after a corresponding threat assessment has been completed. In this manner, a cache can be cleared or storage space updated to allow for storage of other data, thereby reducing memory strains that would otherwise be caused by storing and not deleting the snapshots.

In any combination of the above embodiments of the computer-implemented method, the computer-implemented method further includes causing an operating system component to access a user profile defining operating-system level authorization, the snapshot being captured based on the operating-system level authorization of the user profile.

In any combination of the above embodiments of the computer-implemented method, the snapshot is communicated based on at least one of: the mismatch between the present context and the expected context for the application being inconclusive; or a prior snapshot not having been previously captured or communicated within a threshold time value.

In any combination of the above embodiments of the computer-implemented method, further comprising causing an operating system component to initiate a security mitigation based on a server communication from the distributed server system, wherein the security mitigation is determined based on a snapshot phishing machine learning model trained on a plurality of present content features, the security mitigation initiated based on the snapshot and a classification of a threat determined by the snapshot phishing machine learning model being used by the distributed server system.

In any combination of the above embodiments of the computer-implemented method, detecting the mismatch is based on at least one of: a comparison of a present URL and an expected URL, a comparison of a present IP address and an expected IP address, a comparison of a present process ID and an expected process ID, a comparison of a present Server Name Indication (SNI) and an expected SNI, or a comparison of a present domain information and an expected domain information.

In any combination of the above embodiments of the computer-implemented method, the snapshot comprises a snapshot that is less than a screenshot of the entire graphical user interface presented to the user at the moment in time that the snapshot is captured.

In any combination of the above embodiments of the computer-implemented method, determining that the input corresponds to the credential comprises: intercepting the user input at the operating system level; generating a hash of the input; and comparing the hash of the input with a credential hash of the credential.

In any combination of the above embodiments of the computer-implemented method, further comprising: identifying a threat based on the snapshot and the mismatch; and communicating the threat to the distributed server system.

In any combination of the above embodiments of the computer-implemented method, features of the present context correspond to a present network context and are selected from a group consisting of a URL, an IP address, a process ID, Server Name Indication (SNI), a certificate, an indication of whether the type of application, and domain information.

In any combination of the above embodiments of the computer-implemented method, the credential is associated with a credentialing organization and the expected context is a URL associated with the credentialing organization.

In any combination of the above embodiments of the computer-implemented method, the input is a first set of characters for a password and a security mitigation comprises at least one of: preventing entry of remaining characters in the password or a warning message generated by the operating system.

In some embodiments, a distributed server system is provided, employing any components of the computerized (or computer, computing, or cloud) system described in any of the embodiments above. The distributed server system comprises at least one computer processor, and computer memory having computer-readable instructions embodied thereon, that, when executed by the at least one computer processor, perform operations. The operations comprise accessing a snapshot phishing machine learning model trained on a plurality of snapshot features from a plurality of snapshots; and receiving, from a client device, an indication of a threat based on a mismatch between (1) a present network context from data received from an operating system network sensor and for an application running on the client device, and (2) an expected network context for the application. The operations further comprise classifying, using the snapshot phishing machine learning model or a user input, the threat based on the mismatch. The operations further comprise requesting, based on the threat being classified as an unknown threat, a snapshot of a graphical user interface of the application taken when credentials were input into the client device. The operations further comprise receiving snapshot data associated with the snapshot; automatically determining a security mitigation, based on the threat, the snapshot data, and the snapshot phishing machine learning model; and communicating the security mitigation.

Advantageously, technical effects of some embodiments leverage data across different devices and users to improve a snapshot phishing machine learning model through crowd-sourced data, enhancing the accuracy of identifying a security threat based at least on snapshots. Additionally, by employing the embodiments disclosed herein, the snapshot provides additional details relevant to the classification of the threat, thereby reducing previous threat assessments resulting in an unknown classification. Moreover, to reduce latency, preserve computation resources, and avoid overloading a network bandwidth, embodiments of the technology described herein request the captured snapshot in certain instances. For example, the distributed server system requests the snapshot when the threat assessment provides the "unknown classification." Thereafter, in one example, the snapshot is communicated to the distributed server system for further analysis. In this manner, network bandwidth is conserved by not automatically communicating every snapshot. Locally, in some embodiments, a cache is employed to have the snapshot readily available to facilitate classifying the threat. The snapshot are deleted after a period of time or after a corresponding threat assessment has been completed. In this manner, the cache can be cleared or storage space updated to allow for storage of other data, thereby reducing memory strains that would otherwise be caused by storing and not deleting the snapshots.

In any combination of the above embodiments of the distributed server system, the operations further comprise: in response to receiving the snapshot data associated with the snapshot, extracting a snapshot feature from the snapshot based on the snapshot data; and associating, using the snapshot phishing machine learning model, the snapshot feature of the snapshot to existing snapshot features of the plurality of snapshot features, wherein the security mitigation is automatically determined based on the association.

In any combination of the above embodiments of the distributed server system, the snapshot feature from the snapshot comprises at least one of: a text font size, a text style, a text color, a text language, a text arrangement, a color, a shape, a bounded box, or a GUI element In any combination of the above embodiments of the distributed server system, the snapshot is requested based on at least one of: a request for training data; the mismatch between the present network context and the expected network context for the application being inconclusive; or a prior snapshot not having been previously requested within a threshold time value.

In some embodiments, at least one computer-storage media is provided. The computer-storage media has computer-executable instructions embodied thereon that, when executed by a computing system having at least one processor and at least one memory, cause the computing system to: receive, via a graphical user interface and at the computing system, an input addressed to an application; determine that the input corresponds to a credential; determine a present network context for the application from data received from an operating system network sensor; detect a mismatch between the present network context and an expected network context for the application; capture a snapshot of the graphical user interface based on the mismatch; receive, from a distributed server system, a request for at least a portion of the snapshot; and communicate, according to the request, at least the portion of the snapshot to the distributed server system.

Advantageously, technical effects of these and other embodiments, as described herein, employ a snapshot to receive and use additional details relevant to the classification of the threat, thereby reducing previous threat assessments resulting in an unknown classification. Moreover, to reduce latency, preserve computation resources, and avoid overloading a network bandwidth, embodiments of the technology described herein request the captured snapshot in certain instances. For example, the snapshot is captured when the threat assessment provides the "unknown classification." Thereafter, in one example, the snapshot is communicated for further analysis. In this manner, network bandwidth is conserved by not automatically communicating every snapshot. Locally, in some embodiments, the snapshot is deleted after a period of time or after a corresponding threat assessment has been completed. In this manner, a cache can be cleared or storage space updated to allow for storage of other data, thereby reducing memory strains that would otherwise be caused by storing and not deleting the snapshots.

In any combination of the above embodiments of the at least one computer-storage media, the computer-executable instructions further cause an operating system component to access a user profile defining operating-system level authorization, the snapshot being captured based on the operating-system level authorization of the user profile.

In any combination of the above embodiments of the at least one computer-storage media, the snapshot is communicated based on at least one of: the mismatch between the present network context and the expected network context for the application being inconclusive; an unknown classification assigned to the mismatch; or a prior snapshot not having been previously communicated within a threshold time value.

In any combination of the above embodiments of the at least one computer-storage media, the computer-executable instructions further cause an operating system component to initiate a security mitigation based on a server communication from the distributed server system, wherein the security mitigation is determined based on a snapshot phishing machine learning model trained on a plurality of present network content features, the security mitigation initiated based on a classification of a threat determined by the snapshot phishing machine learning model being used by the distributed server system.

In any combination of the above embodiments of the at least one computer-storage media, the snapshot is only communicated if the mismatch is classified as an unknown threat.

The technology described herein has been described in relation to particular embodiments, which are intended in all respects to be illustrative rather than restrictive. While the technology described herein is susceptible to various modifications and alternative constructions, certain illustrated embodiments thereof are shown in the drawings and have been described above in detail. It should be understood, however, that there is no intention to limit the technology described herein to the specific forms disclosed. On the contrary, the intention is to cover all modifications, alternative constructions, and equivalents falling within the spirit and scope of the technology described herein.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described herein. For instance, various functions may be carried out by a processor executing instructions stored in memory. As such, other arrangements and elements (for example, machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving" or "transmitting," as facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely an example. Components can be configured for performing novel aspects of embodiments, where the term "configured for" can refer to "programmed to" perform particular tasks or implement particular abstract data types using code. Further, while embodiments of the present invention generally refer to the technical solution environment and the schematics described herein, it is understood that the techniques described may be extended to other implementation contexts.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer-storage media comprising computer-executable instructions that when executed by a computing device cause the computing device to:
   receive, via a graphical user interface and at the computing device, an input addressed to an application;
   determine that the input corresponds to a credential;
   determine a present context for the application from data received from an operating system network sensor;
   detect a mismatch between the present context and an expected context for the application, the mismatch corresponding to an unknown threat classification, and the mismatch can be detected based on any one of: a comparison of a present uniform resource locator (URL) and an expected URL, a comparison of a present IP address and an expected IP address, a comparison of a present process ID and an expected process ID, a comparison of a present Server Name Indication (SNI) and an expected SNI, a comparison of a present domain information and an expected domain information, a comparison of a present network context and an expected network context, or a comparison of a present certificate and an expected certificate;
   capture a snapshot of the graphical user interface based on the mismatch;
   receive a request for at least a portion of the snapshot based on the unknown threat classification; and
   communicate, according to the request, at least the portion of the snapshot.

2. The media of claim 1, wherein the instructions further cause an operating system component to access a user profile defining operating-system level authorization, the snapshot being captured based on the operating-system level authorization of the user profile.

3. The media of claim 1, wherein the snapshot is communicated based on at least one of:
   the mismatch between the present context and the expected context for the application being inconclusive; or a prior snapshot not having been previously captured or communicated within a threshold time value.

4. The media of claim 1, wherein the instructions further cause an operating system component to initiate a security mitigation based on a server communication from a distributed server system, wherein the security mitigation is determined based on a snapshot phishing machine learning model trained on a plurality of present content features, the security mitigation initiated based on the snapshot and a classification of a threat determined by the snapshot phishing machine learning model being used by the distributed server system.

5. The media of claim 1, wherein the snapshot comprises a snapshot that is less than a screenshot of the entire graphical user interface presented to the user at the moment in time that the snapshot is captured.

6. The media of claim 1, wherein determining that the input corresponds to the credential comprises:
intercepting the user input at the operating system level;
generating a hash of the input; and
comparing the hash of the input with a credential hash of the credential.

7. The media of claim 1, wherein the instructions further cause the computing device to:
identify a threat based on the snapshot and the mismatch; and
communicate the threat to a distributed server system.

8. The media of claim 1, wherein features of the present context correspond to a present network context and are selected from a group consisting of a URL, an IP address, a process ID, Server Name Indication (SNI), a certificate, an indication of whether the type of application, and domain information.

9. The media of claim 1, wherein the credential is associated with a credentialing organization and the expected context is a URL associated with the credentialing organization.

10. The media of claim 1, wherein the input is a first set of characters for a password and a security mitigation comprises at least one of: preventing entry of remaining characters in the password or a warning message generated by the operating system.

11. A distributed server system, comprising:
at least one computer processor; and
computer memory storing computer-usable instructions that, when used by the at least one computer processor, cause the at least one computer processor to perform operations comprising:
accessing a snapshot phishing machine learning model trained on a plurality of snapshot features from a plurality of snapshots;
receiving, from a client device, an indication of a threat based on a mismatch between (1) a present network context from data received from an operating system network sensor and for an application running on the client device, and (2) an expected network context for the application, and wherein the mismatch between the present network context and expected network context can be determined based on any one of: a comparison of a present uniform resource locator (URL) and an expected URL, a comparison of a present IP address and an expected IP address, a comparison of a present process ID and an expected process ID, a comparison of a present Server Name Indication (SNI) and an expected SNI, a comparison of a present domain information and an expected domain information, a comparison of a present network context and an expected network context, or a comparison of a present certificate and an expected certificate;
classifying, using the snapshot phishing machine learning model or a user input, the threat based on the mismatch;
based on the threat being classified as an unknown threat, requesting a snapshot of a graphical user interface of the application taken when credentials were input into the client device;
receiving snapshot data associated with the snapshot;
automatically determining a security mitigation, based on the threat, the snapshot data, and the snapshot phishing machine learning model; and
communicating the security mitigation.

12. The distributed server system of claim 11, wherein the operations comprise:
in response to receiving the snapshot data associated with the snapshot, extracting a snapshot feature from the snapshot based on the snapshot data; and
associating, using the snapshot phishing machine learning model, the snapshot feature of the snapshot to existing snapshot features of the plurality of snapshot features, wherein the security mitigation is automatically determined based on the association.

13. The distributed server system of claim 11, wherein the snapshot feature from the snapshot comprises at least one of: a text font size, a text style, a text color, a text language, a text arrangement, a color, a shape, a bounded box, or a GUI element.

14. The distributed server system of claim 11, wherein the snapshot is requested based on at least one of:
a request for training data;
the mismatch between the present network context and the expected network context for the application being inconclusive; or
a prior snapshot not having been previously requested within a threshold time value.

15. At least one computer-storage media having computer-executable instructions embodied thereon that, when executed by a computing system having at least one processor and at least one memory, cause the computing system to:
receive, via a graphical user interface and at the computing system, an input addressed to an application;
determine that the input corresponds to a credential;
determine a present network context for the application from data received from an operating system network sensor;
detect a mismatch between the present network context and an expected network context for the application, and the mismatch can be detected based on any one of: a comparison of a present URL and an expected URL, a comparison of a present IP address and an expected IP address, a comparison of a present process ID and an expected process ID, a comparison of a present Server Name Indication (SNI) and an expected SNI, a comparison of a present domain information and an expected domain information, a comparison of a present network context and an expected network context, or a comparison of a present certificate and an expected certificate;
capture a snapshot of the graphical user interface based on the mismatch;
receive, from a distributed server system, a request for snapshot data associated with the snapshot; and communicate, according to the request, at least the snapshot data to the distributed server system.

16. The at least one computer-storage media of claim 15, wherein the computer-executable instructions further cause an operating system component to access a user profile defining operating-system level authorization, the snapshot being captured based on the operating-system level authorization of the user profile.

17. The at least one computer-storage media of claim 15, wherein the snapshot data comprises at least a portion of the snapshot and is communicated based on at least one of:
   the mismatch between the present network context and the expected network context for the application being inconclusive;
   an unknown classification assigned to the mismatch; or
   a prior snapshot not having been previously communicated within a threshold time value.

18. The at least one computer-storage media of claim 15, wherein the computer-executable instructions further cause an operating system component to initiate a security mitigation, wherein the security mitigation is determined based on a snapshot phishing machine learning model trained on a plurality of present network content features, the security mitigation initiated based on a classification of a threat determined by the snapshot phishing machine learning model and operating on the computing system.

19. The at least one computer-storage media of claim 15, wherein the snapshot data comprises at least a portion of the snapshot, and wherein the snapshot data is only communicated if the mismatch is classified as an unknown threat.

* * * * *